(12) United States Patent
Kuno et al.

(10) Patent No.: US 8,819,406 B2
(45) Date of Patent: Aug. 26, 2014

(54) INFORMATION PROCESSING DEVICE, INFORMATION PROCESSING METHOD, AND PROGRAM

(75) Inventors: Hiroshi Kuno, Kanagawa (JP); Kenjiro Ueda, Kanagawa (JP); Munetake Ebihara, Kanagawa (JP); Takamichi Hayashi, Tokyo (JP); Koji Yoshimura, Kanagawa (JP)

(73) Assignee: Sony Corporation (JP)

( * ) Notice: Subject to any disclaimer, the term of this patent is extended or adjusted under 35 U.S.C. 154(b) by 461 days.

(21) Appl. No.: 13/208,391

(22) Filed: Aug. 12, 2011

(65) Prior Publication Data
US 2012/0047360 A1 Feb. 23, 2012

(30) Foreign Application Priority Data
Aug. 23, 2010 (JP) ................ P2010-185832

(51) Int. Cl.
*H04L 29/06* (2006.01)
(52) U.S. Cl.
USPC ........................................................ 713/150
(58) Field of Classification Search
CPC .............. H04L 9/00; H04L 9/08; H04L 63/04
USPC ........................................................ 713/150
See application file for complete search history.

(56) References Cited

U.S. PATENT DOCUMENTS

| 7,970,135 | B1* | 6/2011 | Schwenk | 380/46 |
| 2005/0244001 | A1* | 11/2005 | Kitani et al. | 380/201 |
| 2006/0150251 | A1* | 7/2006 | Takashima et al. | 726/26 |
| 2007/0136282 | A1* | 6/2007 | Takashima | 707/6 |
| 2012/0045062 | A1* | 2/2012 | Kuno et al. | 380/277 |
| 2012/0159193 | A1* | 6/2012 | Spradlin | 713/190 |

FOREIGN PATENT DOCUMENTS

| EP | 1791121 A2 | 5/2007 |
| JP | 2008-098765 A | 4/2008 |

OTHER PUBLICATIONS

European Search Report EP 11177537, dated Dec. 23, 2011.
Intel Corporation Et Al: Advanced Access Content System (AACS), Blu-ray Disc Pre-recorded Book, Revision 0.92, Dec. 5, 2007, page Complete, XP 55012339, Retrieved from the Internet: URL:http://www.aacsla.com/specifications/AACS_Spec_BD_Prerecorded 0.92.pdf.

* cited by examiner

Primary Examiner — Teshome Hailu
(74) Attorney, Agent, or Firm — Lerner, David, Littenberg, Krumholz & Mentlik, LLP

(57) ABSTRACT

An information processing device including: a data processing unit that generates content for transmitting to a client; and a communication unit that transmits the generated content of the data processing unit, wherein the data processing unit generates, based on basic encrypted content having a plurality of units that each includes a SEED that is data for encryption key generation and a block that is encrypted data that is encrypted by an encryption key generated using the SEED, each data of (a) converted encrypted content on which conversion processing to replace the SEED with dummy data or to delete the SEED is performed, and (b) encrypted SEED that is the SEED encrypted by content transmission processing or by individual keys that are different by units of users at a transmission destination, and transmits the generated converted encrypted content and encrypted SEED as data provided to the client via the communication unit.

14 Claims, 17 Drawing Sheets

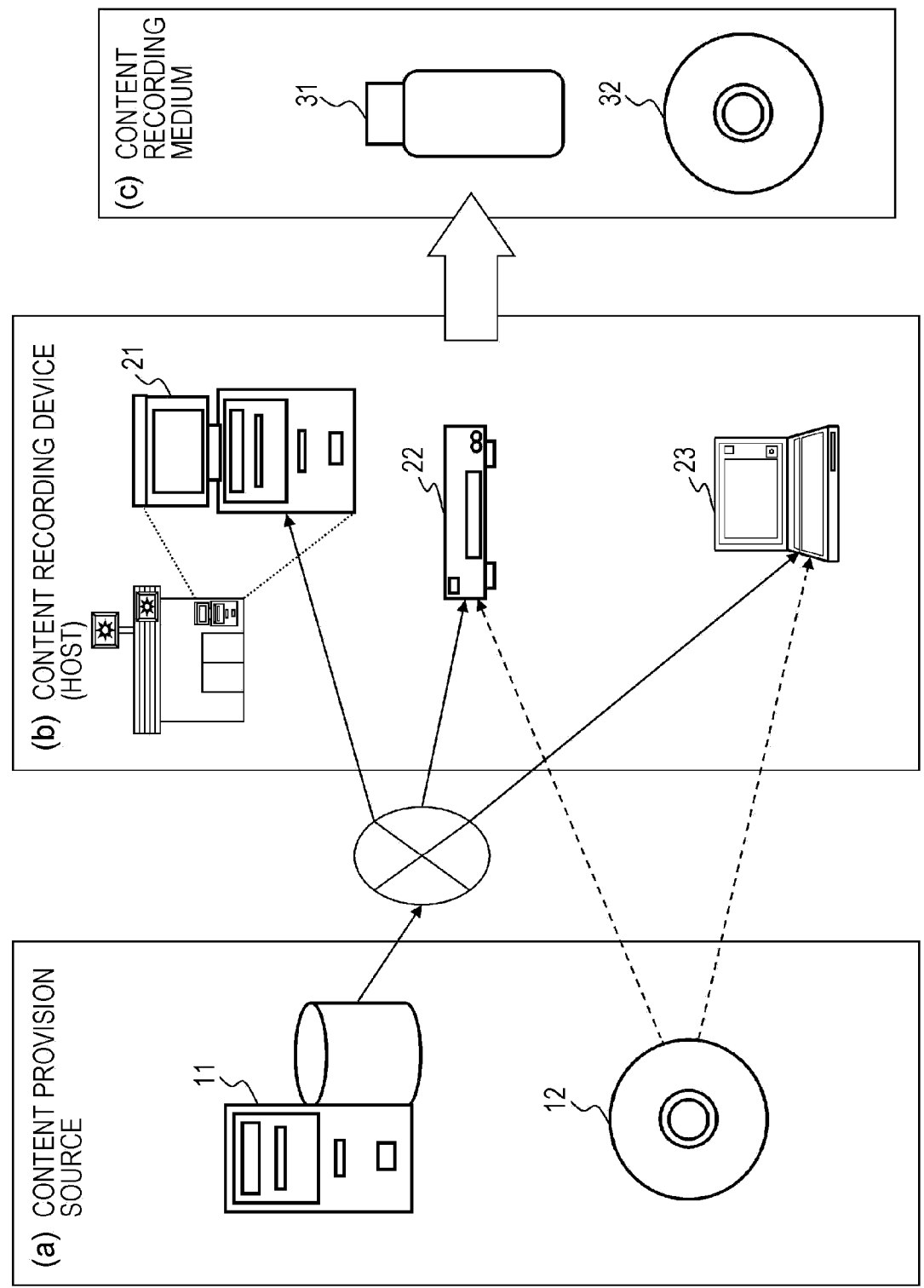

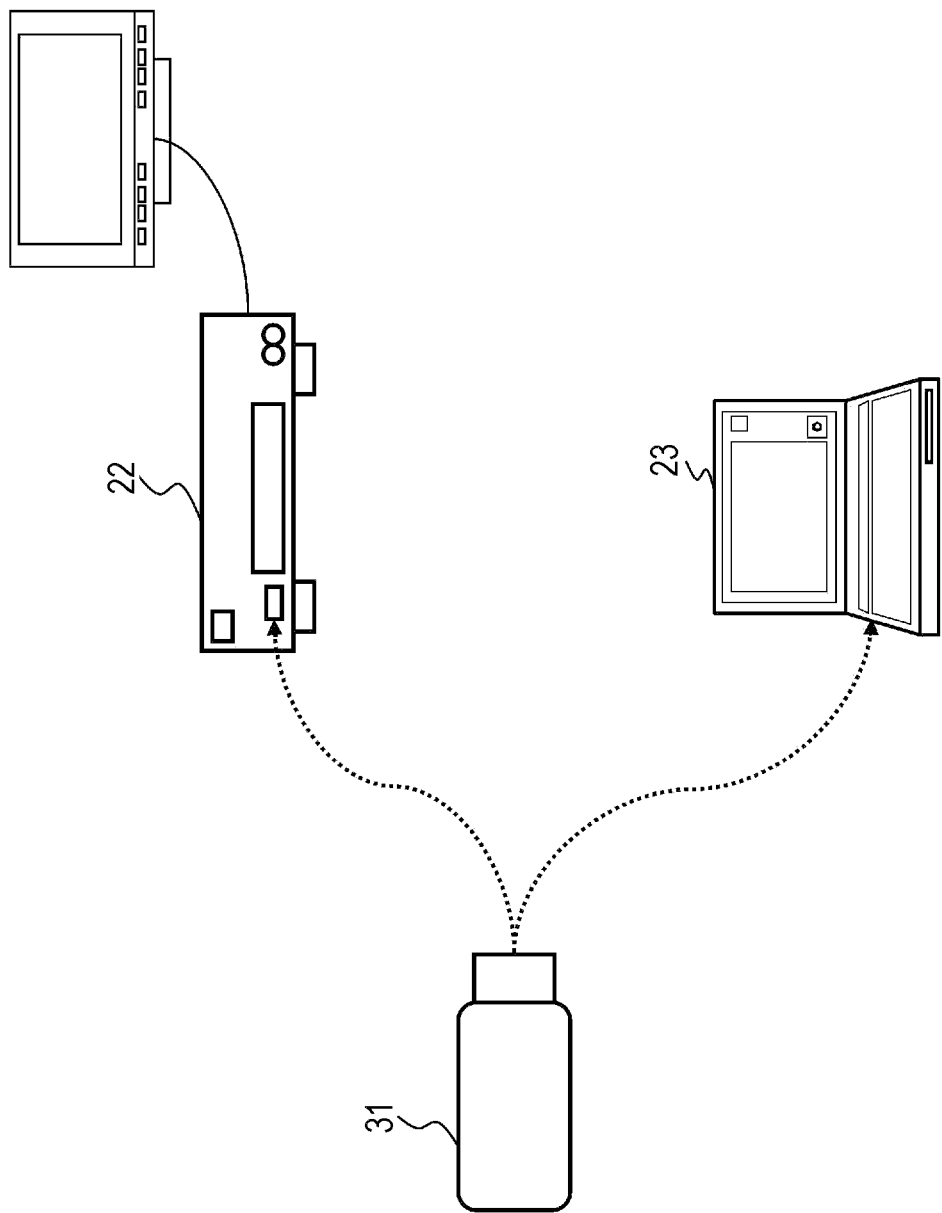

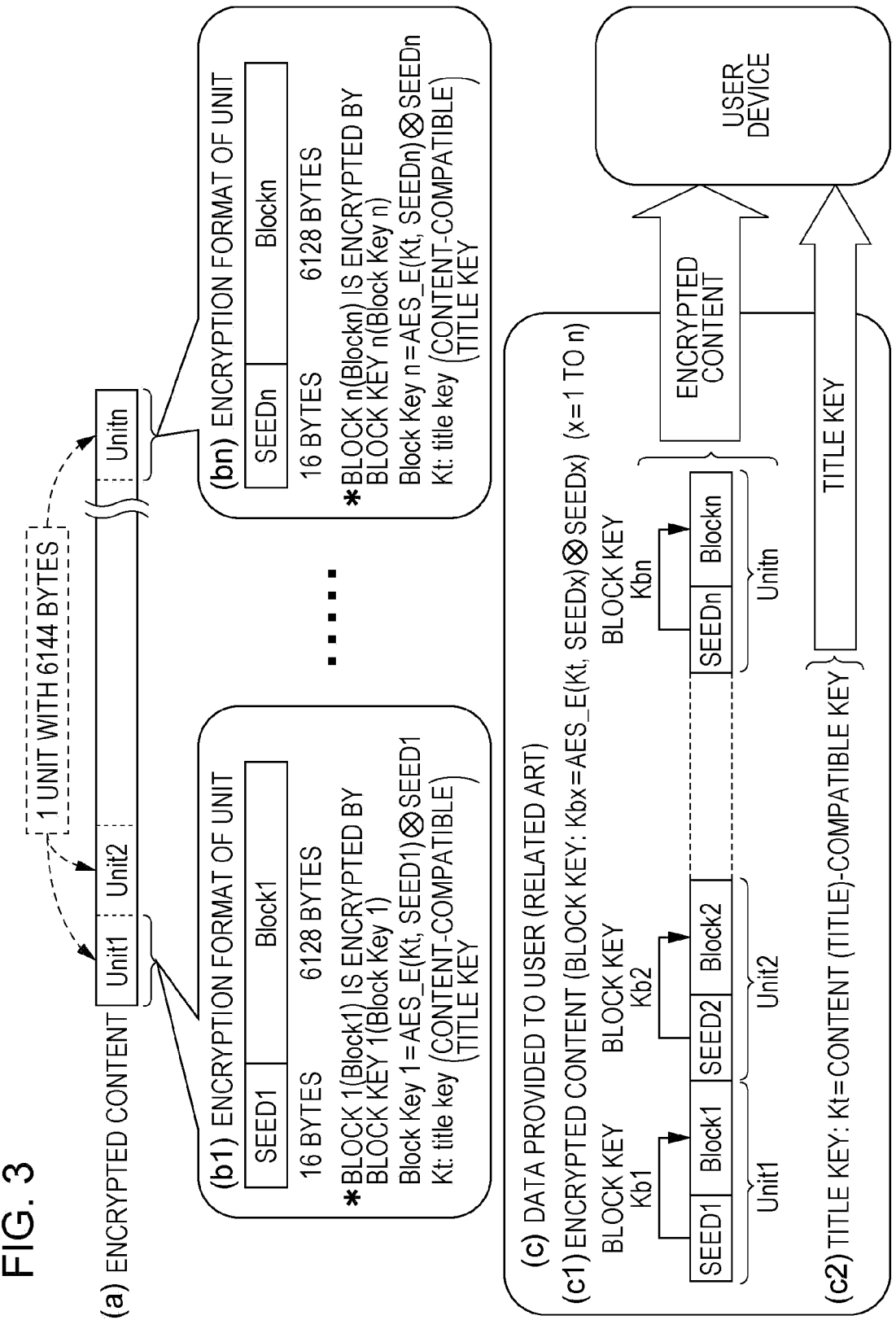

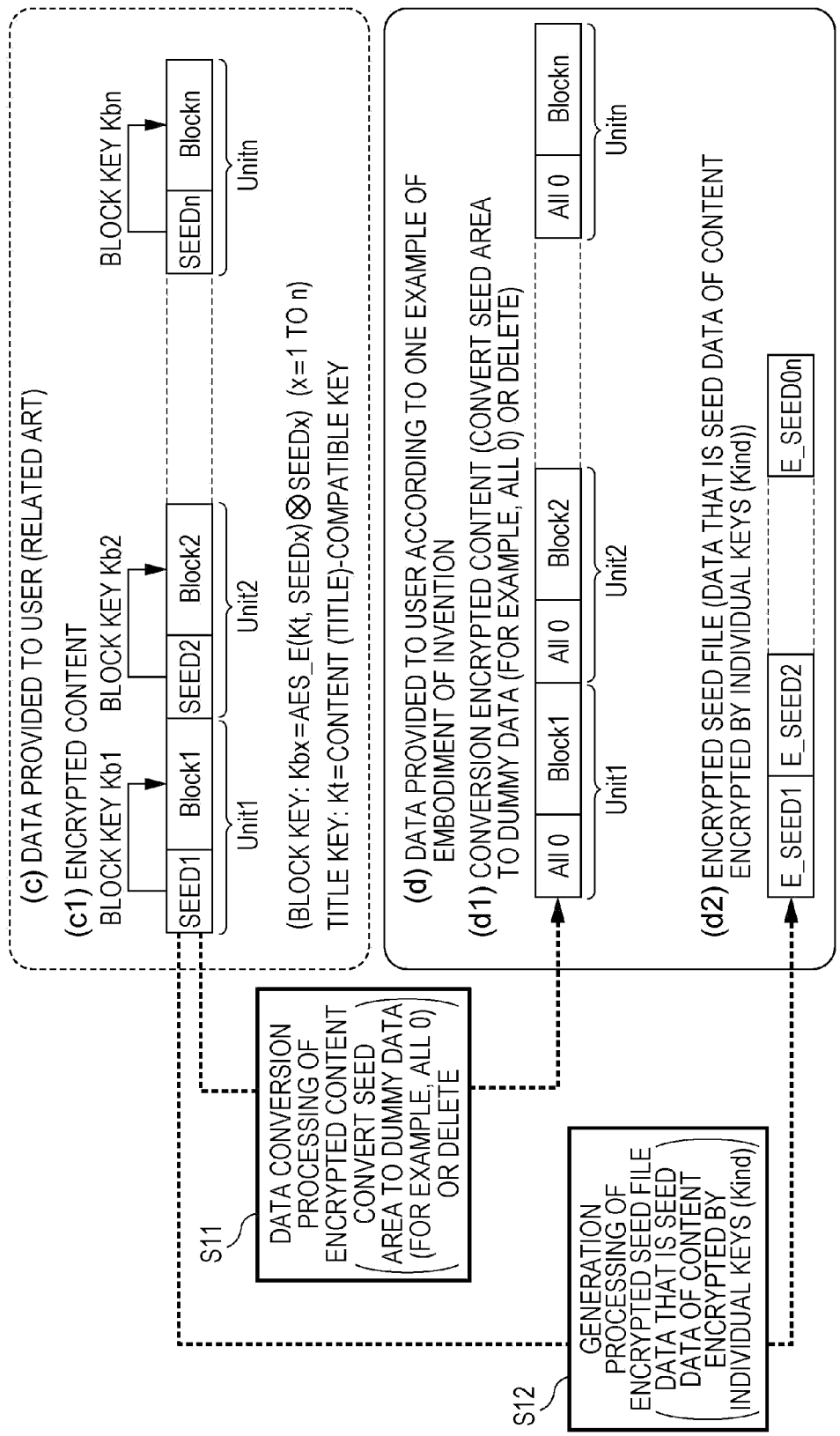

FIG. 5

(d) DATA PROVIDED TO USER ACCORDING TO EMBODIMENT OF DISCLOSURE (d1) CONVERSION ENCRYPTED CONTENT
(CONVERT SEED AREA (FOR EXAMPLE, ALL 0) OR DELETE)

| All 0 | Block1 | All 0 | Block2 | ... | All 0 | Blockn |

Unit1, Unit2, ... Unitn (d2) ENCRYPTED SEED FILE
(DATA THAT IS SEED DATA OF CONTENT ENCRYPTED BY INDIVIDUAL KEYS (Kind))

| E_SEED1 | E_SEED2 | ... | E_SEED0n |

(d3) INDIVIDUAL KEYS: Kind=INDIVIDUAL KEYS THAT ARE DIFFERENT BY UNITS OF CONTENT TRANSMISSION···E (Kses, Kind)

(d4) TITLE KEY: Kt=CONTENT (TITLE)-COMPATIBLE KEY···E (Kind, Kt)

→ USER DEVICE 100

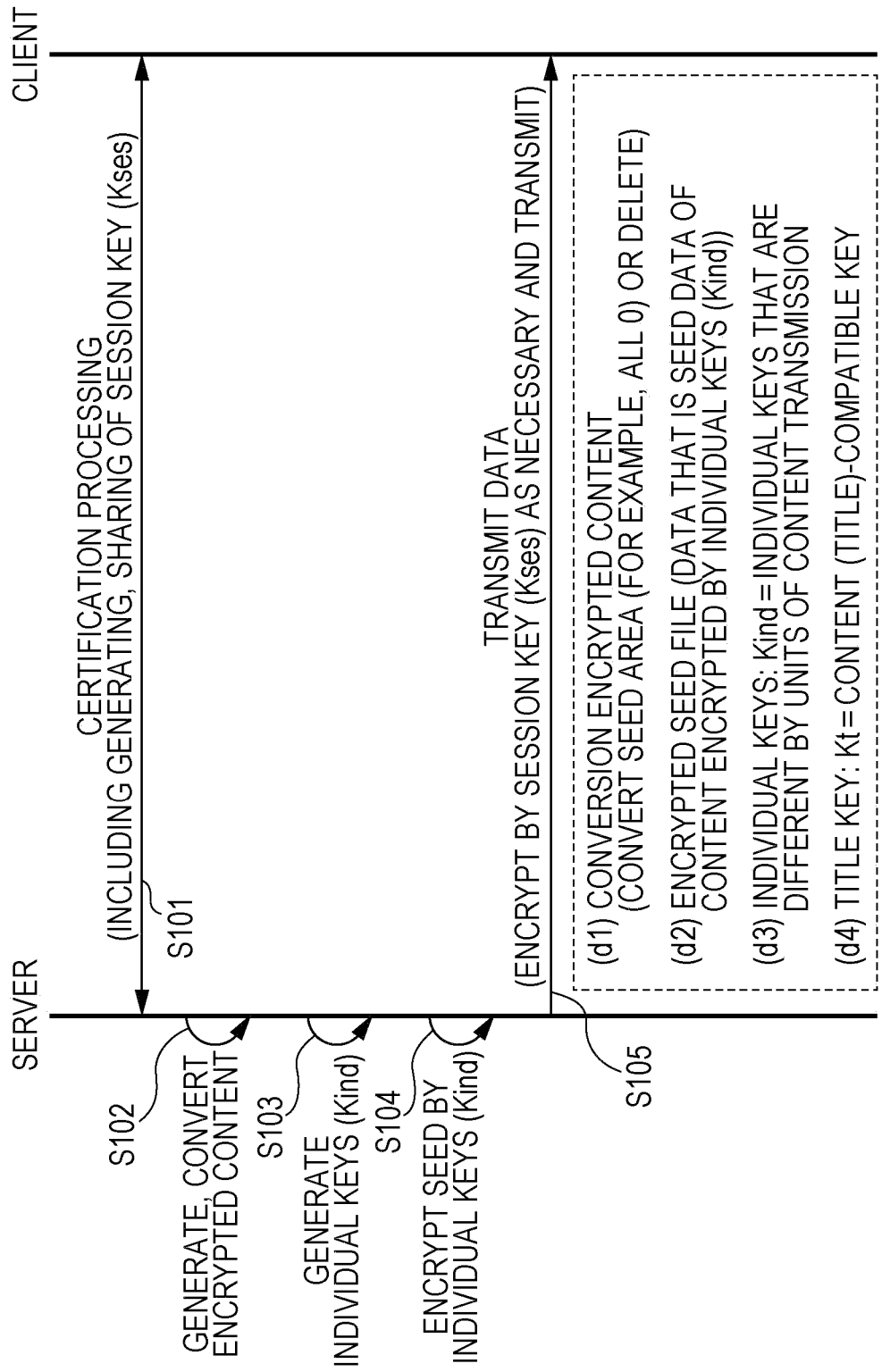

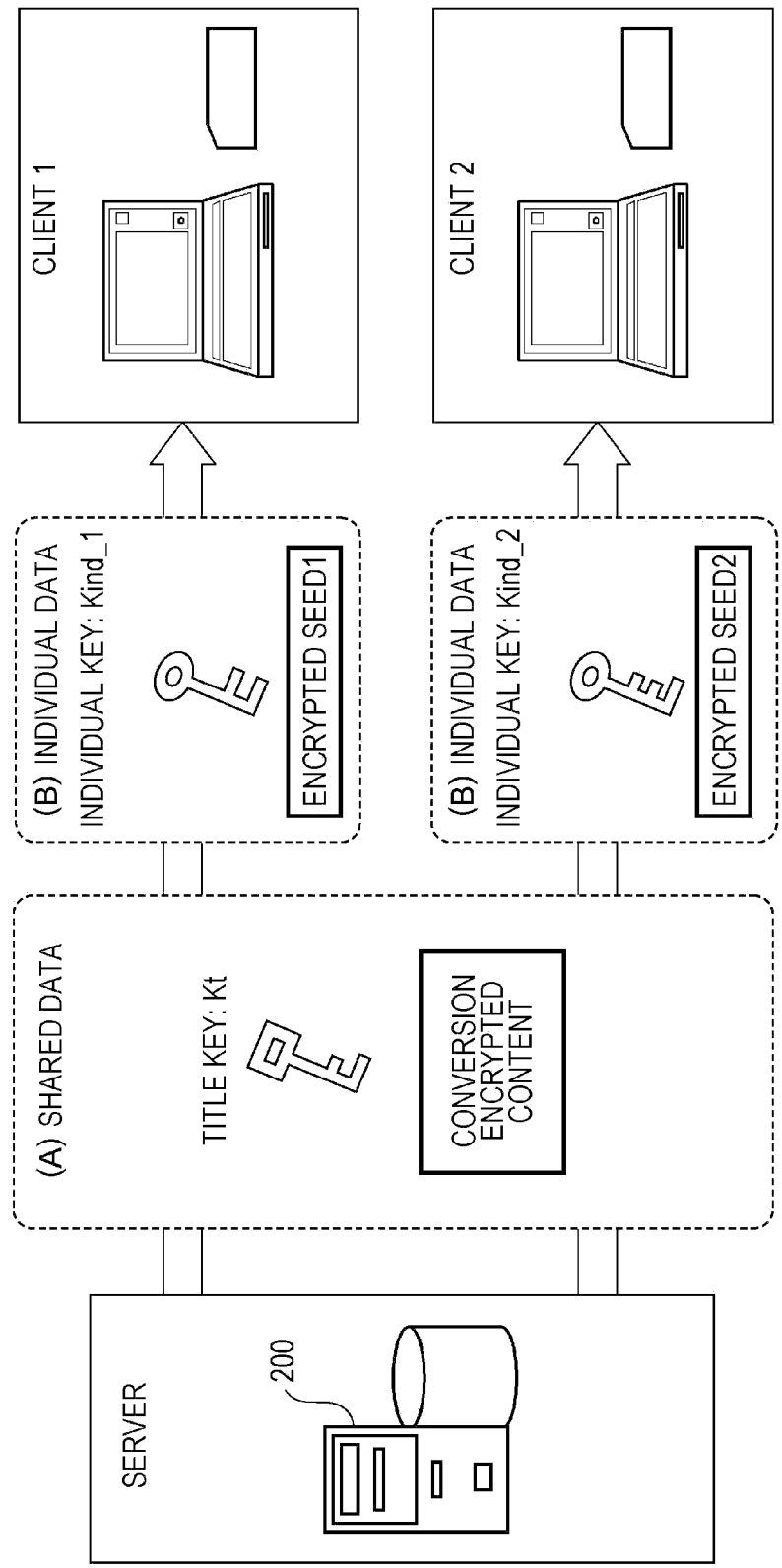

FIG. 8

| TRANSMISSION PROCESSING UNIQUE ID | TRANSMISSION CONTENT INFORMATION | TITLE KEY (Kt) INFORMATION | INDIVIDUAL KEY (Kind) INFORMATION | TRANSMISSION DESTINATION INFORMATION | TRANSMITTING USER | TRANSMISSION TIME AND DATE INFORMATION |
|---|---|---|---|---|---|---|
| 5784102578 | ABC STORY | 154366…a21 | 2317cad…31 | xyz@patnet.co.jp | SUZUKIICHIRO | 07.22.2010 |
| 2354711245 | ABC STORY | 154366…a21 | 012ea765…22 | jkl@ynos.ne.jp | TANAKAKAORU | 09.15.2010 |
| …. | …. | …. | …. | …. | …. | …. |

INFORMATION PROCESSING DEVICE, INFORMATION PROCESSING METHOD, AND PROGRAM

CROSS-REFERENCE TO RELATED APPLICATION

The present application claims priority from Japanese Patent Application No. JP 2010-185832 filed in the Japanese Patent Office on Aug. 23, 2010, the entire content of which is incorporated herein by reference.

BACKGROUND

The present disclosure relates to an information processing device, an information processing method, and a program. In particular, the disclosure relates to an information processing device that realizes a configuration for the prevention of illegitimate use of content, an information processing method, and a program.

Recently, a variety of media such as DVDs (Digital Versatile Disc), Blu-ray Discs (registered trademark), and flash memories has been used as information recording media. In particular, recently, the use of memory cards such as USB memories with a mass storage flash memory built therein has been popularized. By recording content such as music and movies on such a variety of information recording media and equipping the media on a reproduction device (player), a user is able to perform reproduction of the content.

In addition, in recent years, the circulation of content via networks has become popularized, and the form of the content purchasing process by a user is gradually shifting from the purchasing process of discs on which content is recorded in advance to the process of downloading from a server that is network connected.

As specific content purchasing forms, as well as the process of performing purchase of media such as ROM discs, for example, there are the below content purchasing forms:
(a) EST (Electric Sell Through) of connecting to a content providing server using a user device such as a network connectable terminal, a PC, or the like, and purchasing the content by downloading; and
(b) MoD (Manufacturing on Demand) of recording content on a medium (memory card or the like) of a user using a shared terminal set up in a public space such as a convenience store or a train station.

In so doing, by owning media such as a content recording memory card, a user is able to selectively purchase and record on their own media a variety of content freely from a variety of content sources such as content providers.

Here, the processing of EST, MoD, and the like is described in Japanese Unexamined Patent Application Publication No. 2008-98765.

However, with many forms of content such as music data, image data, and the like, the copyright, distribution rights, and the like are held by the creator or the seller. Therefore, in a case when content is provided to users, typically, the use of content is approved only for users with certain use restrictions, that is, who have a legitimate right of use, and a control is performed such that illegitimate use such as copying without permission is not carried out.

Specifically, in a case when a user downloads content such as a movie from a server and records it on a recording medium such as a memory card of the user, for example, the processing below is performed.

The server provides the content as encrypted content to the client (user device).

Further, the server provides a key for decrypting the encrypted content to only a user who has performed a legitimate content purchasing process.

By performing such content provision processing, realizing use control of content is attempted.

However, even by performing the processing described above, for example, it is difficult to prevent the user who performed a legitimate content purchasing process from providing the key for decrypting the content obtained from the server to other people. Specifically, it may be supposed that the key obtained from the server is, by being disclosed online, set to be usable by an unspecified number of users. When such acts are committed, it becomes possible for anyone to decrypt, reproduce, and use encrypted content using the leaked key, and a situation occurs in which illegitimate use of content is rampant.

SUMMARY

It is desirable to provide an information processing device that realizes a configuration of effectively preventing illegitimate use of content by leaking of keys used in the decrypting of encrypted content, an information processing method, and a program.

According to an embodiment of the disclosure, there is provided an information processing device including: a data processing unit that generates content for transmitting to a client; and a communication unit that transmits the generated content of the data processing unit, wherein the data processing unit generates, based on basic encrypted content having a plurality of units that each includes a SEED that is data for encryption key generation and a block that is encrypted data that is encrypted by an encryption key generated using the SEED, each data of (a) converted encrypted content on which conversion processing to replace the SEED with dummy data or to delete the SEED is performed, and (b) encrypted SEED that is the SEED encrypted by content transmission processing or by individual keys that are different by units of users at a transmission destination, and transmits the generated converted encrypted content and encrypted SEED as data provided to the client via the communication unit.

In the information processing device according to the embodiment of the disclosure, the blocks of each unit included in the converted encrypted content may be blocks that are encrypted by block keys that are generated by encryption processing between SEEDs of before conversion that are included in the same units as the blocks in the basic encrypted content and a content-compatible title key.

In the information processing device according to the embodiment of the disclosure, the data processing unit may generate the individual keys by random number generation processing.

In the information processing device according to the embodiment of the disclosure, the data processing unit may perform processing to generate management information that is the individual keys made to correspond with content transmission destination information and to store the management information in a memory unit.

In the information processing device according to the embodiment of the disclosure, the data processing unit may further encrypt and transmit the generated individual keys as data provided to the client via the communication unit.

In the information processing device according to the embodiment of the disclosure, the data processing unit may further encrypt and transmit the content-compatible title key as data provided to the client via the communication unit.

In the information processing device according to the embodiment of the disclosure, the data processing unit may generate an encrypted title key by encrypting the title key by an encryption key generated by applying medium IDs that are identifiers of a recording medium received from the client and binding keys that are successively generated, and may transmit the generated encrypted title key and the binding keys to the client via the communication unit.

In the information processing device according to the embodiment of the disclosure, the data processing unit may execute certification processing with the client, may further generate a session key that is a shared secret key, and may perform encryption of data transmitted to the client by applying the generated session key.

According to another embodiment of the disclosure, there is provided an information processing device including: a memory unit that stores encrypted content; and a data processing unit that executes reproduction processing of the encrypted content stored in the memory unit, wherein in the memory unit is stored each data of (a) converted encrypted content on which conversion processing to replace the SEED with dummy data or to delete the SEED is performed, and (b) encrypted SEED that is the SEED encrypted by content transmission processing or by individual keys that are different by units of users at a transmission destination, that are generated based on basic encrypted content having a plurality of units that each includes a SEED that is data for encryption key generation and a block that is encrypted data that is encrypted by an encryption key generated using the SEED, and the data processing unit decrypts the encrypted SEED by individual keys, generates the basic encrypted content by setting the decrypted SEED in a SEED area of the converted encrypted content, and executes decryption processing of content by executing block key generation processing by units on the generated basic encrypted content.

According to still another embodiment of the disclosure, there is provided an information processing device including: a communication unit that receives data transmitted from a server; and a data processing unit that executes data processing on data received via the communication unit and that executes data storage processing to a memory unit, wherein the communication unit receives, from the server, each data of (a) converted encrypted content on which conversion processing to replace the SEED with dummy data or to delete the SEED is performed, and (b) encrypted SEED that is the SEED encrypted by content transmission processing or by individual keys that are different by units of users at a transmission destination, that are generated based on basic encrypted content having a plurality of units that each includes a SEED that is data for encryption key generation and a block that is encrypted data that is encrypted by an encryption key generated using the SEED, and the data processing unit executes reconversion of the converted encrypted content of setting the encrypted SEED in a SEED area of the converted encrypted content, and executes processing to record the reconverted encrypted content in the memory unit.

According to still another embodiment of the disclosure, there is provided an information processing method that is executed by an information processing device as a server, including: data processing by a data processing unit of generating content for transmitting to a client; and communicating of transmitting content generated in the data processing by a communication unit, wherein the data processing includes generating of each data of (a) converted encrypted content on which conversion processing to replace the SEED with dummy data or to delete the SEED is performed, and (b) encrypted SEED that is the SEED encrypted by content transmission processing or by individual keys that are different by units of users at a transmission destination, that are based on basic encrypted content having a plurality of units that each includes a SEED that is data for encryption key generation and a block that is encrypted data that is encrypted by an encryption key generated using the SEED, and the communicating transmits the generated converted encrypted content and the encrypted SEED.

According to still another embodiment of the disclosure, there is provided an information processing method that is executed by an information processing device, the information processing device including: a memory unit in which encrypted content is stored; and a data processing unit that executes reproduction processing of the encrypted content stored in the memory unit, wherein in the memory unit is stored each data of (a) converted encrypted content on which conversion processing to replace the SEED with dummy data or to delete the SEED is performed, and (b) encrypted SEED that is the SEED encrypted by content transmission processing or by individual keys that are different by units of users at a transmission destination, that are generated based on basic encrypted content having a plurality of units that each includes a SEED that is data for encryption key generation and a block that is encrypted data that is encrypted by an encryption key generated using the SEED, and the data processing unit decrypts the encrypted SEED by an individual key, generates the basic encrypted content by setting the decrypted SEED in a SEED area of the converted encrypted content, and executes decryption processing of content by executing block key generation processing by units on the generated the basic encrypted content.

According to still another embodiment of the disclosure, there is provided an information processing method that is executed by an information processing device, the information processing device including: a communication unit that receives the data transmitted from a server; and a data processing unit that executes data processing on the data received via the communication unit and that executes data storage processing to a memory unit, wherein the communication unit receives, from the server, each data of (a) converted encrypted content on which conversion processing to replace the SEED with dummy data or to delete the SEED is performed, and (b) encrypted SEED that is the SEED encrypted by content transmission processing or by individual keys that are different by units of users at a transmission destination, that are generated based on basic encrypted content having a plurality of units that each includes a SEED that is data for encryption key generation and a block that is encrypted data that is encrypted by an encryption key generated using the SEED, and the data processing unit executes reconversion of the converted encrypted content of setting the encrypted SEED in a SEED area of the converted encrypted content, and executes processing to record the reconverted encrypted content in the memory unit.

According to still another embodiment of the disclosure, there is provided a program that executes information processing in an information processing device as a server, including: data processing of causing a data processing unit to generate content for transmission to a client; and communicating of causing a communication unit to transmit the content generated in the data processing, wherein in the data processing, (a) converted encrypted content on which conversion processing to replace the SEED with dummy data or to delete the SEED is performed, and (b) encrypted SEED that is the SEED encrypted by content transmission processing or by individual keys that are different by units of users at a transmission destination are caused to be generated based on basic encrypted content having a plurality of units that each includes a SEED that is data for encryption key generation and a block that is encrypted data that is encrypted by an encryption key generated using the SEED, and in the communicating, the generated converted encrypted content and the encrypted SEED are caused to be transmitted.

According to still another embodiment of the disclosure, there is provided a program that executes information processing in an information processing device, the information processing device including: a memory unit in which encrypted content is stored; and a data processing unit that executes reproduction processing of the encrypted content stored in the memory unit, wherein in the memory unit is stored each data of (a) converted encrypted content on which conversion processing to replace the SEED with dummy data or to delete the SEED is performed, and (b) encrypted SEED that is the SEED encrypted by content transmission processing or by individual keys that are different by units of users at a transmission destination, that are generated based on basic encrypted content having a plurality of units that each includes a SEED that is data for encryption key generation and a block that is encrypted data that is encrypted by an encryption key generated using the SEED, and the program causes the data processing unit to decrypt the encrypted SEED by an individual key, generate the basic encrypted content by setting the decrypted SEED in a SEED area of the converted encrypted content, and execute decryption processing of content by executing block key generation processing by units on the generated basic encrypted content.

According to still another embodiment of the disclosure, there is provided a program that executes information processing in an information processing device, the information processing device including: a communication unit that receives the data transmitted from a server; and a data processing unit that executes data processing on the data received via the communication unit and that executes data storage processing to a memory unit, wherein the program causes the communication unit to receive, from the server, each data of (a) converted encrypted content on which conversion processing to replace the SEED with dummy data or to delete the SEED is performed, and (b) encrypted SEED that is the SEED encrypted by content transmission processing or by individual keys that are different by units of users at a transmission destination, that are generated based on basic encrypted content having a plurality of units that each includes a SEED that is data for encryption key generation and a block that is encrypted data that is encrypted by an encryption key generated using the SEED, and causes the data processing unit to execute reconversion of the converted encrypted content of setting the encrypted SEED in a SEED area of the converted encrypted content, and execute processing to record the reconverted encrypted content in the memory unit.

Here, a program according to an embodiment of the disclosure is, for example, a program that is able to be provided by a memory medium or a communication medium that is able to provide the program in a computer readable format to an information processing device or a computer system that is able to execute a variety of program codes. By providing such a program in a computer readable format, processing that is suited for the program is realized on the information processing device or the computer system.

Further objects, characteristics, and advantages of the embodiments of the disclosure will be made clear in the following examples of embodiments of the disclosure and the more detailed descriptions based on the attached drawings. Here, in the present specifications, a system is a logically collected configuration of a plurality of devices, and the devices of the respective configurations are not limited to be within the same housing.

According to the configuration of the embodiments of the disclosure, a configuration in which the illegitimate use of content based on leaking of the encryption key of the content is prevented is realized. Specifically, as the content for transmitting to the client, each data of (a) converted encrypted content on which conversion processing to replace the SEED with dummy data or to delete the SEED is performed, and (b) encrypted SEED that is the SEED encrypted by content transmission processing or by individual keys that are different by units of users at a transmission destination, that are generated based on basic encrypted content having a plurality of units that each includes a SEED that is data for encryption key generation and a block that is encrypted data that is encrypted by an encryption key generated using the SEED, is generated and provided to the client. The encryption key information is managed while corresponding to the content transmission destination information. By such processing, even if the content-compatible title key is leaked, content decryption is not possible with only the title key, and the illegitimate use of content is able to be prevented. Further, in a case when an individual key is leaked, it becomes possible to investigate the source of the leak of the individual key based on the management information.

BRIEF DESCRIPTION OF THE DRAWINGS

FIG. 1 is a diagram describing the outline of content provision processing and use processing;

FIG. 2 is a diagram describing the use form of content recorded on a memory card;

FIG. 3 is a diagram describing a basic configuration example of content and data provided to a general user of the related art;

FIG. 4 is a diagram describing a configuration example of data provided to the user according to one example of the disclosure;

FIG. 5 is a diagram describing a configuration example of data provided to the user according to one example of the disclosure;

FIG. 6 is a sequence diagram describing a content provision sequence between a server and a client according to one example of the disclosure;

FIG. 7 is a diagram describing a configuration example of data provided to the user according to one embodiment of the disclosure;

FIG. 8 is a diagram describing a data example recorded in management information of a server;

DETAILED DESCRIPTION OF EMBODIMENTS

Figure 9:
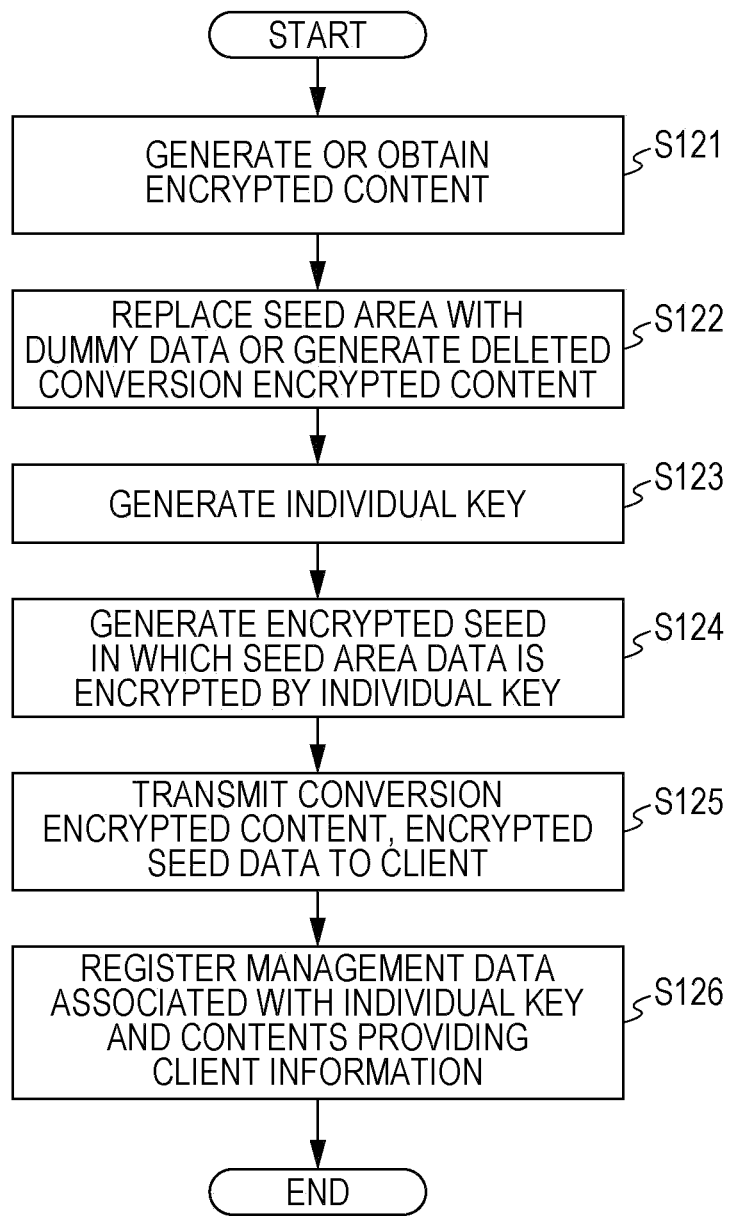
FIG. 9 is a diagram illustrating a flowchart describing a processing sequence of content provided to a client by a server.

An information processing device, an information processing method, and a program according to the embodiments of the disclosure will be described below in more detail with reference to the drawings. Here, description will be made according to the items below.

1. Outline of Content Provision Processing and Use Processing

2. Basic Configuration Example of Content and Data Provided to User of Related Art 3. One Example of Content and Data Provided to User According to Embodiment of Disclosure 4. Processing Sequence of Processing Executed by Server and Client
 (4-1) Data Processing Sequence by Server
 (4-2) Content Reproduction Sequence by Client
 (4-3) Processing Sequence of Recording Received Data on Medium by Client
 (4-4) Second Content Reproduction Sequence by Client 5. Content Provision Processing Sequence Applying Binding Key 6. Hardware Configuration Example of Each Device 1. Outline of Content Provision Processing and Use Processing An information processing device, an information processing method, and a program according to the embodiments of the disclosure will be described below with reference to the drawings.

First, the outline of content provision processing and use processing will be described with reference to FIG. 1.

The following are illustrated in FIG. 1 from the left.
 (a) Content provision source
 (b) Content recording device (host)
 (c) Content recording medium A (c) content recording medium is a medium on which a user records content and which is used for reproduction processing of the content. In FIG. 1, a memory card 31 including a recording unit composed of, for example, a flash memory or the like and a data recordable disc 32 are illustrated.

The user records and uses a variety of content such as, for example, music and movies on the memory card 31 or the disc 32. Such content is, for example, copyright managed content or the like, and content that is subject to use control. Use is only permitted under predetermined use conditions, and, essentially, illegitimate copy processing, unrestricted distribution of copied data, and the like are banned. Here, in a case when content is recorded on the memory card 31 or the disc 32, use control information (usage rules) regulating copy restriction information that is the number of times that such recorded content is permitted to be copied, restriction information of output to other apparatuses, and the like, is often collectively recorded.

The (a) content provision source illustrated in FIG. 1 is the provision source of use restricted content such as music and movies. A content server 11 and a content recording disc 12, such as a ROM disc on which content is recorded in advance, are illustrated in FIG. 1.

The content server 11 is a server that provides content, such as music and movies. The content recording disc 12 is a disc such as a ROM disc on which content, such as music and movies, is recorded in advance.

The user is able to receive (download) and record content on the memory card 31 by equipping, for example, the memory card 31 that is a (c) content recording medium illustrated in FIG. 1 on a (b) content recording device (host) and connecting to the content server 11 via the (b) content recording device (host).

Here, the content server 11 performs processing according to a predetermined sequence when download processing, and provides information for content reproduction such as, as well as encrypted content, key information that is applied to the decryption of the encrypted data to the client. Further, there may be a case when content related information such as use control information of the content and a token on which content management information other than the content ID is recorded is provided.

Other than download processing from the content server 11, the user is able to copy content from the (a) content recording disc 12 illustrated in FIG. 1 and record on the memory card 31 that is a (c) content recording medium.

For example, the user performs copying of recorded content on the content recording disc 12 to the memory card 31 by equipping the content recording disc 12 such as a ROM disc on which content is recorded in advance on a (b) content recording device (host) equipped with a memory card 31. However, if the copy processing is executed illegitimately, the copied content is unlimitedly multiplied. In order to avoid such a situation, for example, when content copy processing from a medium on which encrypted content according to an AACS (Advanced Access Content System) standard is recorded, processing connected to the content server 11 and following a predetermined sequence is performed. Such copy processing is known as managed copying (MC). Here, the ARCS regulates a variety of standards for copyright protection of the content.

In a case when content copying is performed according to managed copying (MC), content is recorded on a medium to be copied on by connecting a recording reproduction device 22 and a PC 23 of the (b) content recording device (host) illustrated in FIG. 1 to the content server 11 and receiving content management information such as use control information or a token corresponding to the copied content and, further, key information that is applied to the decryption of encrypted content, from the content server 11.

In so doing, the user is able to record and use the content on a (c) content recording medium owned by the user such as the memory card 31 illustrated in FIG. 1 by either form of download processing content from a server or content copy processing from a disc on which the content is recorded.

Here, as a device that records content on a medium of the user, as illustrated by the (b) content recording device (host) in FIG. 1, there is a variety of apparatuses usable by an unspecified number of users such as a shared terminal 21 set up in a public space such as a convenience store or a train station, and a recording reproducer (CE (Consumer Electronics) apparatus) 22 and the PC 23 that are user apparatuses.

Such apparatuses are all devices that are able to equip the memory card 31 that is a (c) content recording medium.

Further, such (b) content recording media (hosts) are provided with a communication unit that executes data transceiving processing via a network in a case when they have configurations executing download processing from the content server 11, and are devices capable of disc reproduction in a case when they have configurations using the content recording disc 12.

As illustrated in FIG. 1, the user records, via the (b) content recording device (host), downloaded content from the content server 11 that is the (a) content provision source or content recorded on the content recording disc 12 such as a ROM disc to the memory card 31 or the disc 32 that is a (c) content recording medium.

The use form of the content recorded on the memory card 31 or the disc 32 will be described with reference to FIG. 2.

Here, a processing example in a case when the content recording medium is the memory card 31 will be described below.

The user reads and reproduces the content recorded on the memory card 31 by equipping the memory card 31, on which content is recorded, on, for example, the recording reproducer (CE apparatus) 22, the PC 23, or the like that are user apparatuses as (b) content recording devices (hosts) described with reference to (b) of FIG. 1.

Here, in many cases, such content is recorded as encrypted content, and reproduction devices such as the recording reproducer (CE apparatus) 22 or the PC 23 perform content reproduction after executing decryption processing according to a predetermined sequence.

Here, an apparatus that reproduces the content recorded on the memory card 31 is not limited to the (b) content recording device (host) described with reference to FIG. 1, and may be another reproduction device (player). However, the reproduction device is, for example, an apparatus that is able to execute decryption processing and the like of the decrypted content according to a sequence regulated in advance, that is, an apparatus that has a stored program that executes a reproduction processing sequence regulated in advance. Here, the details of the content reproduction sequence will be described later.

2. Basic Configuration Example of Content and Data Provided to User of Related Art Next, a basic configuration example of content and data provided to a general user of the related art will be described with reference to FIG. 3.

The configuration illustrated in FIG. 3 is a basic configuration example of encrypted content according to the AACS (Advanced Access Content System) standard that is recorded on, for example, a Blu-ray (registered trademark) disc or the like. Here, as stated above, the AACS regulates a variety of standards for copyright protection of the content. As a typical encryption configuration of an AACS standard, there is a configuration that demarcates the content into units and applies a different encryption key to each unit. By adopting such an encryption configuration, use control of the content units becomes possible, and a strict and varied use control is realized.

Each of the data below is illustrated in FIG. 3.
(a) Encrypted content
(b) Encryption format of each unit that configures the encryption content
(c) Data provided to the user (related art)

The (a) encryption content of FIG. 3 is content such as, for example, movies, and corresponds to the configuration of content recorded on, for example, a BD (Blu-ray (registered trademark) disc) or the like.

As illustrated in (a) FIG. 3, the content is demarcated into units. One unit includes data of 6144 bytes.

The encryption format by units is illustrated by (b) of FIG. 3.

Encryption formats for (b1) Unit1 and (bn) Unitn are illustrated in (b1).

Unit1 to Unitn have the same configuration, that is, include a SEED of 16 bytes and block data of 6128 bytes.

The SEED is used as data for encryption key generation, and the block is a data area that is encrypted by an encryption key generated by applying the SEED.

Specifically, a title key (Kt) that is a content-compatible encryption key and a block key (Kbx) that is an encryption key for the block using the seed (SEEDx) of each unit are generated for each unit x (x=1 to n), and the block (Block_x) is encrypted by the generated block key (Kbx).

That is, in the example illustrated in the drawing, the blocks 1 to n of each unit of 1 to n units is encrypted by different block keys (Kb1 to Kbn) generated using, respectively, different SEEDs 1 to n.

The content is encrypted content having a configuration as illustrated by the (c1) encrypted content of FIG. 3.

Here, the block key (Kbx) is generated by, for example, the below operation processing.

$$Kbx=(AES\_E(Kt,SEEDx))(XOR)(SEEDx)$$

In the above expression, AES_E(Kt, SEEDx) represents the encryption processing (AES Encryption) of the SEEDx by the title key, and (XOR) represents an exclusive OR operation.

That is, the block key of each unit is calculated as the exclusive OR (XOR) operation result between the data (AES_E(Kt, SEEDx)) that is the SEED (SEEDx) of the Unitx encrypted by the title key (Kt) and the SEED (SEEDx).

Encryption of the block (blockx) of each unit is carried out using the unit-compatible block keys (Kbx) generated as above.

Encrypted content composed of a plurality of units having encrypted blocks that have different block keys applied by units as described above are provided to the user via a disc or a server.

An example of the data provided to the user is illustrated by (c) in FIG. 3. The data provided to the user includes the below data.
(c1) Encrypted content
(c2) Title key (Kt)

The (c1) encrypted content is encrypted content generated according to the above description, and is data that links encrypted blocks that are generated by the SEEDs and the title key and that applies the block keys.

The (c2) title key (Kt) is a title key (Kt) that is content-compatible.

A typical provision form of such (c1) encrypted content and (c2) title key (Kt) in the past has been to record on a disc or the like, or to provide to the user from a server.

In a case when decryption processing of encrypted content is performed, the user executes decryption of the blocks of each unit by generating block keys for each of the units and using the generated block keys. That is, content reproduction is executed by applying the expression for generating block keys described above and the expression below, $$Kbx=(AES\_E(Kt,SEEDx))(XOR)(SEEDx)$$

using the title key (Kt) and the SEED data (SEEDx) of each block, generating the block keys x (Kbx) of each unit x, and executing decryption of the blocks by units.

Here, the SEED data is provided to the user as unencrypted plain text data.

However, in a case when the (c1) encryption content and the (c2) title key (Kt) are provided to the user as above, if the user subsequently leaks the title key (Kt), it becomes possible, for example, for a user with illegitimate content to decrypt copied content, and use control of the content becomes not possible.

In particular, nowadays, private individuals disclose a variety of information on networks, and if a title key is disclosed as one such piece of information, the title key immediately becomes usable by any person. In such a case, use control of the content becomes not possible.

In order to prevent such a situation, embodiments of the disclosure have changed the configuration of the data provided to the user.

3. One Example of Content and Data Provided to User According to Embodiment of Disclosure A configuration example of data provided to the user according to one example of the disclosure will be described with reference to FIG. 4 below.

The data of (c) data provided to the user (related art) and (d) data provided to the user according to one example of the disclosure are illustrated in FIG. 4.

The (c) data provided to the user (related art) of FIG. 4 is the same as the (c) data provided to the user (related art) of FIG. 3, and the (c1) encrypted content is the same encrypted content as that described with reference to FIG. 3. That is, it is content in which encryption of the blocks of each unit is carried out applying the block key (Kb) generated using the SEED and the title key (Kt). That is, it is content in which the blocks of the units are encrypted by the block keys x (Kbx) generated using the title key (Kt) and the SEED data of each block (SEEDx) by the equation below:

$$Kbx=(AES\_E(Kt,SEEDx))(XOR)(SEEDx).$$

In an embodiment of the disclosure, although the basic encryption configuration of such original content is not changed, the configuration of the data provided to the user is data in which the configuration of the (c1) encrypted content is changed.

The processing of steps S11 and S12 illustrated in FIG. 4 corresponds to the generation processing of the data provided to the user.

For example, such processing is executed by the content provision server.

The processing step S11 is data conversion processing of encrypted content. Specifically, data of the SEED areas (SEED1 to SEEDn) of the encrypted content is replaced by dummy data, for example, dummy data set to all 0 or all 1. Alternatively, the SEED data is deleted.

The processing result is the data illustrated by (d1) converted encrypted content in FIG. 4. The data illustrated by (d1) in FIG. 4 is data in which the SEED areas (SEED1 to SEEDn) are all set to 0 (All 0).

The block areas (block1 to blockn) are the same as the (c1) encrypted content, and is data in which each block is encrypted by block keys (Kbx) that are generated by a unit-compatible SEED and a title key.

That is, the blocks of each unit included in the converted encrypted content are blocks that are encrypted by a SEED of before conversion included in the same unit as the blocks in the original encrypted content, and by block keys that are generated by encryption processing of a content-compatible title key.

Further, the processing of step S12 is executed. The processing of step 12 is generation processing of an encrypted SEED file.

The encrypted SEED file is data in which all of the configuration data of the SEEDs (SEED1 to SEEDn) of each unit of the (c1) encrypted content is extracted, and that is encrypted applying individual keys that are different by units of the content provision processing. Such data is, for example, the data illustrated by (d2) encrypted SEED file in FIG. 4.

E_SEEDx shown in (d2) of FIG. 4 indicates data in which SEEDx is encrypted by individual keys (Kind).

The individual keys (Kind) are keys generated by, for example, a content provision server by performing random number generation processing or the like for each successive content provision processing, and are set as keys that are different by units of content transmission or by units of users.

Here, the generated key information is registered and stored on a server along with the content provision destination information.

The data shown in (d) of FIG. 4 is one portion of the data provided to the user.

One example of a set of data provided to a user device (client) 100 is illustrated in FIG. 5.

As illustrated in FIG. 5, for example, the following data is provided to the user device (client) 100.

(d1) Converted encrypted content
(d2) Encrypted SEED files
(d3) Individual keys
(d4) Title key The (d1) converted encrypted content is, as described above, encrypted content in which the SEED area of each unit that is demarcated data that configures the content is converted to dummy data (all 0 or the like) or deleted. The blocks of each unit are content that is encrypted by the block keys (Kb) generated by the same title key as the related art and the usual SEEDs.

The (d2) encrypted SEED files are data that is the usual SEED data encrypted by applying individual keys (Kind).

The (d3) individual keys are keys that are set to be different by units of content provision or by units of the transmission users, and are keys that are applied to the encryption and decryption of the (d2) encrypted SEED files.

The (d4) title key is the same content-compatible (title-compatible) key as the related art, and is a key that is applied to the generation of block keys.

Here, such data is, as necessary, further encrypted by, for example, a session key and provided to a user device (client).

A sequence for providing data from a server to a user device (client) will be described with reference to the sequence diagram illustrated in FIG. 6.

A communication sequence between a server that executes content transmission and a client that performs content reception is illustrated in FIG. 6. Here, both a case when the client is a PC or a recording reproduction device on which a medium such as a memory card is equipped, and a case when the client is a memory card itself with a communication function are included.

First, in step S101, cross certification processing is performed between the server that executes content provision processing and the client that executes content reception processing, for verifying the apparatus legitimacy of both. For example, according to a public key encryption system, cross certification processing including exchange processing of the public key certificates of both is performed. During the certification processing, the server and the client generate, and both share, a session key (Kses) as a shared secret key.

Once the certification processing is ended and verification of both apparatuses is ended, the server generates encrypted content in step S102 and generates converted encrypted content by replacing the SEED area with dummy data or deleting the SEED area. The converted encrypted content is that illustrated by (d1) in FIG. 5.

Furthermore, in step S103, individual keys (Kind) are generated by, for example, random number generation processing.

Next, in step S104, encrypted SEED files are generated by encrypting SEED data using the generated individual keys (Kind). The encrypted SEED file is that illustrated by (d2) in FIG. 5.

Finally, in step S105, the server transmits the following data to the client.
(d1) Converted encrypted content
(d2) Encrypted SEED files
(d3) Individual keys
(d4) Title key Here, while transmitting the above, at least the unencrypted data is encrypted by the session key (Kses) and transmitted.

The client records the received data on a medium, for example, the memory card 31 illustrated in FIG. 1. Here, with regard to the data received as the data encrypted by the session key, recording processing is performed after decrypting with the session key.

In this manner, the server executing content provision processing in an embodiment of the disclosure generates individual keys (Kind) that are different by units of content provision processing or by units of users, and generates individual encrypted SEED files in which only the original SEED data of the original encrypted content is encrypted by applying the generated individual keys (Kind), and provides the encrypted SEED files to the user (client).

Further, the encrypted content is provided to the user (client) by replacing the usual original SEED data with dummy data (all 0 or the like) or deleting the SEED data.

A conceptual diagram of data provided to each client from a server is illustrated in FIG. 7.

As illustrated in FIG. 7, the server 200 provides
(a) content (plain text or encrypted content) and
(b) title key (Kt)
to the clients 1 and 2 that provide content of the same title, all as common data.

However, as data that is different by units of each client, the server 200 provides
(c) individual keys (Kind) and
(d) encrypted SEEDs.

The following data is provided to a client 1 illustrated in FIG. 7.
(a) Converted encrypted content
(b) Title key (Kt)
(c) Individual keys (Kind1)
(d) Encrypted SEED 1

The following data is provided to a client 2 illustrated in FIG. 7.
(a) Converted encrypted content
(b) Title key (Kt)
(c) Individual keys (Kind2)
(d) Encrypted SEED 2

Although the title key is provided to all clients in common, even if the title key is leaked and becomes usable by an unspecified number of users, since the individual keys and the encrypted SEEDs are data that are different by units of clients (units of transmission content), as long as such individual data does not become usable by an unspecified number of users, the illegitimate use of content does not increase.

In addition, since the individual keys are managed by the server along with the transmission destination information, even in the worst case when individual keys or an encrypted SEED that have been spread illegitimately are discovered, it becomes possible to specify the delivery destination of the individual keys.

A data configuration example of the management information retained in a memory section of the server is illustrated in FIG. 8.

As illustrated in FIG. 8, the management information includes, for example, information such as: a unique ID that corresponds to the transmission content; transmission content information; title key (Kt) information; individual key (Kind) information, transmission destination information; transmission user information; and transmission time and date information.

Here, as the title key (Kt) information, in a case when it is a transmission entry of content with the same title, the same data is recorded.

Data that is different for all entries is recorded as the individual key (Kind) information. Here, in a case when the user at the transmission destination is the same, a configuration of using the same individual key may be adopted. In such a case, the individual key is set as key that is different not by units of transmission processing but by units of transmission destination users.

Even in such a case, in a case when there is illegitimate leaking of data, it is possible to specify a user as the source of the leak by collating individual keys.

Here, the example illustrated in FIG. 8 is an example, not all such information is necessary, and information other than such information may be retained as management information.

In this manner, in the configuration of an embodiment of the disclosure, the server that performs content transmission generates, as the content for transmission to the client, based on basic encrypted content having a plurality of units that each includes a SEED that is data for encryption key generation and a block that is encrypted data that is encrypted by an encryption key generated using the SEED, each data of
(a) converted encrypted content on which conversion processing to replace the SEED with dummy data or to delete the SEED is performed, and
(b) encrypted SEED that is the SEED encrypted by content transmission processing or by individual keys that are different by units of users at a transmission destination and provides the data of (a) and (b) to the client.

Further, the individual key information is managed by being made to correspond with a content-compatible title key.

By such processing, even if the content-compatible title key is leaked, content decryption is not possible with only the title key, and the illegitimate use of content is prevented. Further, in a case when an individual key is leaked, it is possibly to specify the transmission destination based on the management information, and it is possible to investigate the source of the leak of the individual key.

4. Processing Sequence of Processing Executed by Server and Client

Next, a processing sequence of processing executed between the server and the client will be described with reference to the flowchart of FIG. 9 and subsequent drawings.

(4-1) Data Processing Sequence by Server

First, provision processing of content to the client by the server will be described with reference to the flowchart illustrated in FIG. 9.

The processing illustrated in FIG. 9 is processing that is executed under the control of the data processing unit of the server.

In step S121, generation or obtaining of encrypted content is performed. The encrypted content is the original encrypted content illustrated in (c) in FIGS. 3 and 4, and is content in which the block data of units is encrypted applying a block key (Kb) generated by the SEED of the unit and the title key.

Next, in step S122, converted encrypted content in which the SEED area of the encrypted data generated or obtained in step S121 is replaced by dummy data (for example, all 0) or deleted is generated. The converted encrypted content is content described earlier with reference to, for example, (d1) in FIGS. 4 and 5.

Next, in step S123, the individual keys (Kind) are generated. The individual key generation processing is executed by, for example, random number generation processing.

Next, in step S124, encrypted SEEDs are generated by encrypting the original SEED data of the encrypted content generated in step S121 by the individual keys (Kind) generated in step S123. The encrypted SEEDs are the encrypted SEEDs described earlier with reference to (d2) in FIGS. 4 and 5.

Next, in step S125, the converted encrypted content, the encrypted SEEDs, and other data are transmitted to the client. The processing corresponds to the processing of step S105 described earlier with reference to the sequence diagram of FIG. 6. Here, the data transmitted to the client includes the individual keys (Kind), the title key (Kt), and the like.

Finally, in step S126, a management information entry in which the individual keys (Kind) and the content provision target client information are made to correspond is generated and stored in the memory unit.

The management information is the management information described earlier with reference to FIG. 8.

(4-2) Content Reproduction Sequence by Client

Next, a content reproduction sequence by the client will be described with reference to the flowchart illustrated in FIG. 10.

Figure 10:
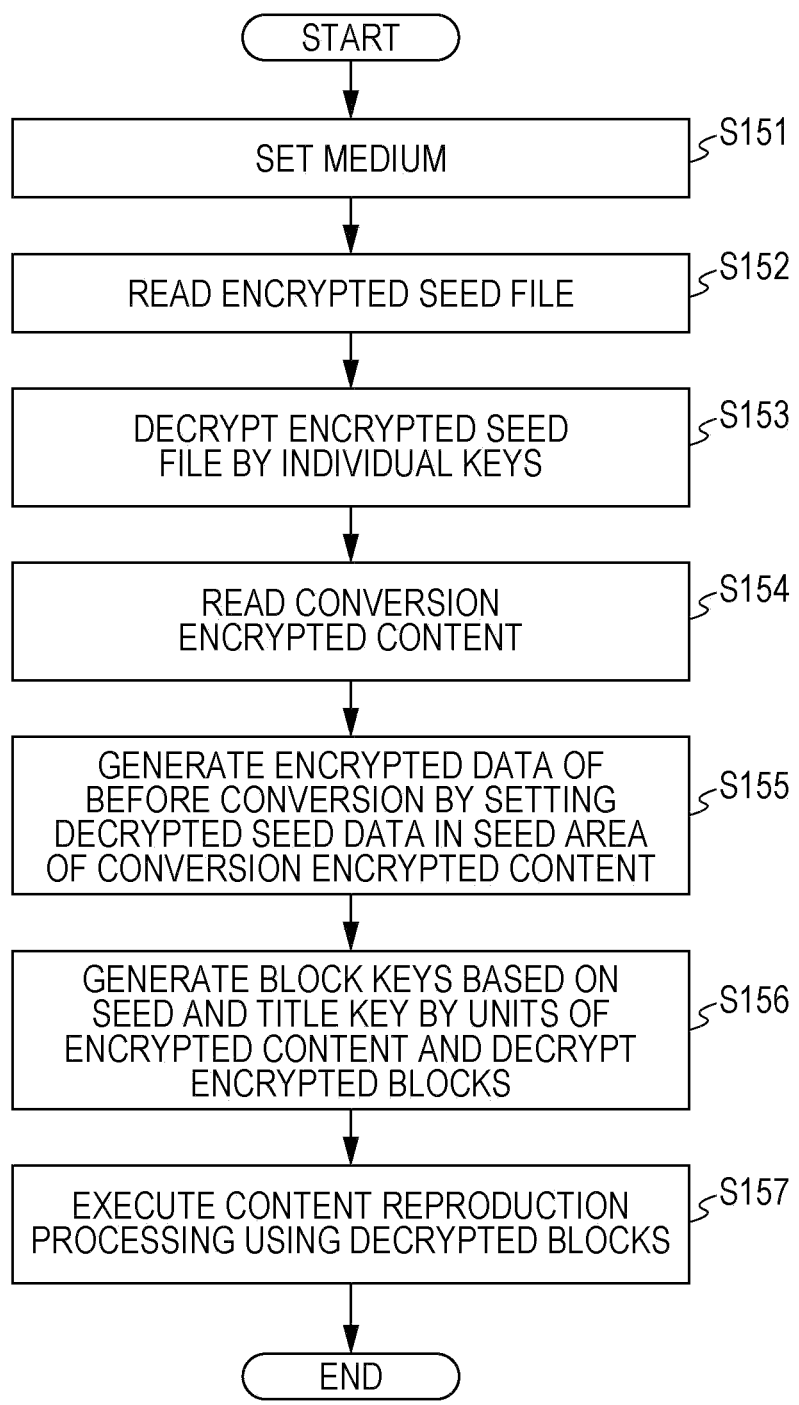
FIG. 10 is a diagram illustrating a flowchart describing a content reproduction sequence by a client.

The processing shown in FIG. 10 is processing that is executed under the control of the data processing unit of the client.

In step S151, a medium on which content is recorded is set in a reproduction device. For example, the memory card illustrated in FIGS. 1 and 2 is set in the recording reproducer 22 or the PC 23 as the reproduction device.

Next, in step S152, an encrypted SEED is read from the medium. The encrypted SEED is, for example, an encrypted SEED encrypted by an individual key (Kind) described earlier with reference to (d2) of FIGS. 4 and 5.

Next, in step S153, the encrypted SEED file is decrypted applying an individual key (Kind). Here, the individual key (Kind) is also received from the server, is recorded on the medium, and is used by being read from the medium.

Next, in step S154, converted encrypted data is read from the medium. The converted encrypted content is, for example, the content described earlier with reference to (d1) in FIGS. 4 and 5. The content is converted encrypted content in which the usual SEED area of the content is replaced by dummy data (for example, all 0) or is deleted.

Next, in step S155, encrypted content of before conversion is generated by setting decrypted SEED data in the SEED area of the converted encrypted content. That is, the processing is equivalent to the processing of returning the converted encrypted data of (d1) in FIG. 4 to the encrypted data of before conversion illustrated by (c1) in FIG. 4.

Next, in step S156, encrypted blocks are decrypted by generating block keys based on the SEED and the title key in units of the encrypted content.

The generation of the block keys is performed, as described earlier, by the expression below.

$$Kbx=(AES\_E(Kt,SEEDx))(XOR)(SEEDx)$$

In the above expression, x represents the block identifier, AES_E(Kt, SEEDx) represents the encryption processing (AES Encryption) of the SEEDx by the title key, and (XOR) represents an exclusive OR operation.

That is, the block key of each unit is obtained as the exclusive OR operation result between the data (AES_E(Kt, SEEDx)) that is the SEED of the unit encrypted by the title key (Kt) and the SEED.

In step S157, content reproduction processing using decrypted blocks is executed. Here, in the content reproduction processing, reproduction processing using both a SEED obtained by decrypting an encrypted SEED and a decrypted block is executed. Here, there is also a case when header information or substance data of the reproduced content used in reproduction processing is included in the SEED area.

In the client device, content reproduction processing is executed upon setting a SEED obtained by decrypting an encrypted SEED file in this manner in a SEED area of converted encrypted content and generating original encrypted content of before conversion. Here, the content reproduction processing of after generating the original encrypted content is executed as reproduction processing accompanying generation of a block key and decryption of block data by units by the generated block key, by the same reproduction sequence as in the related art.

(4-3) Processing Sequence of Recording Received Data on Medium by Client

In the reproduction sequence illustrated in FIG. 10, a configuration has been described in which processing to replace the SEED area of converted encrypted content with the usual SEED data is performed during reproduction processing.

The SEED data replacement processing may be configured to be executed when receiving content from the server or during recording processing on a medium.

A processing sequence of a client in a case when such processing is executed will be described with reference to the flowchart illustrated in FIG. 11.

Figure 11:
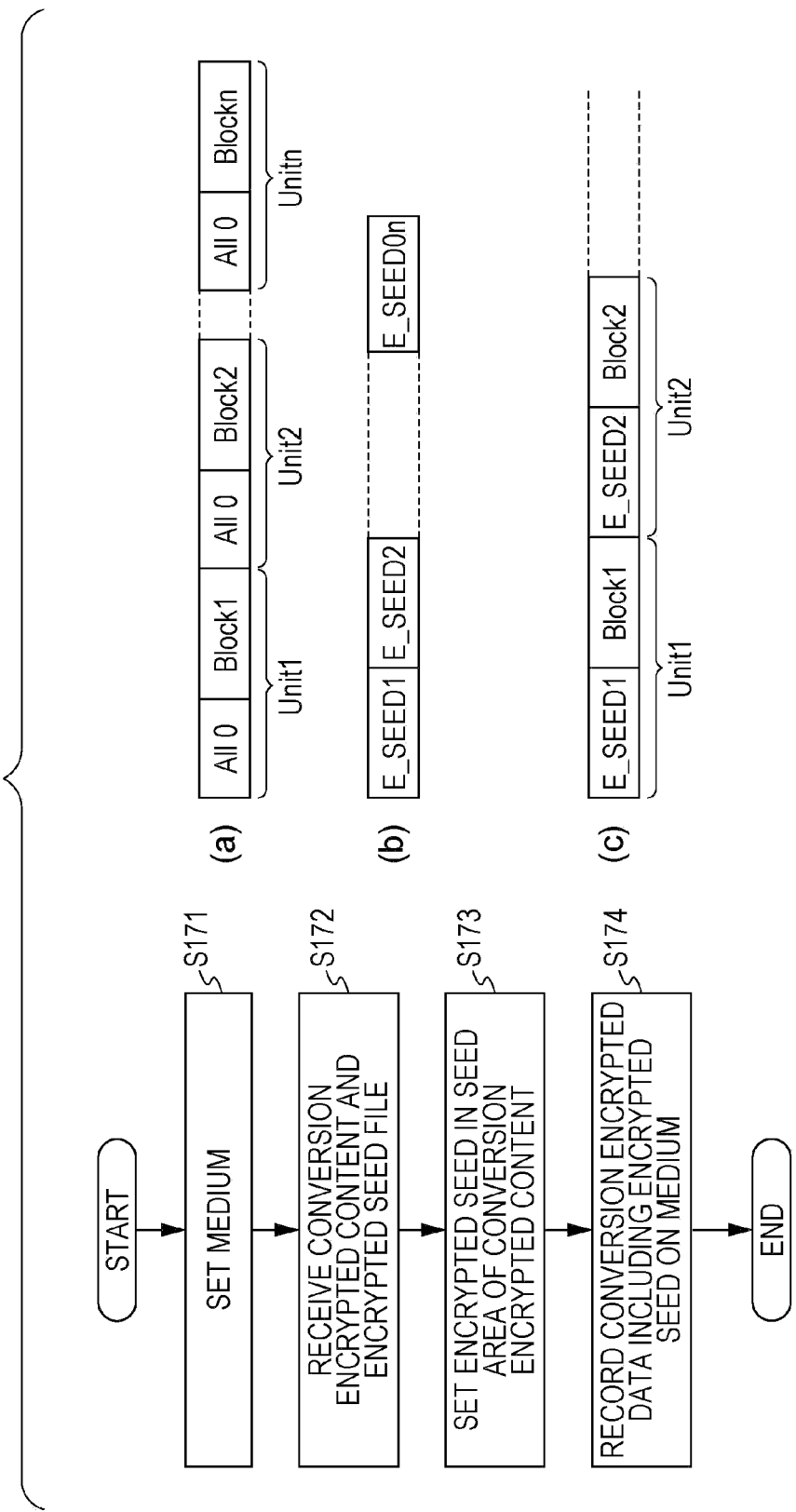
FIG. 11 is a diagram illustrating a flowchart describing a processing sequence in a case when replacement processing of SEED data is executed by a client when content is received from a server and when recording processing on a medium.

The processing illustrated in FIG. 11 is processing that is executed under the control of the data processing unit of the client.

First, in step S171, a medium on which content is to be recorded is set. For example, the memory card 31 illustrated in FIG. 1 is set in a user device (client).

In step S172, converted encrypted content and an encrypted SEED file is received from the server. The processing is processing corresponding to the processing of step S105 described earlier with reference to FIG. 6.

Here, although certification processing or sharing processing of a session key is executed between a server and a client before the data transceiving processing, such processing is omitted from the flow of FIG. 11.

In step S172, the data that the client receives from the server includes, as illustrated in FIG. 11, the following data.

(a) Converted encrypted content
(b) Encrypted SEED

The (a) converted encrypted content is, for example, the content described earlier with reference to (d1) in FIGS. 4 and 5. The content is converted encrypted content in which the usual SEED area of the content is replaced by dummy data (for example, all 0) or is deleted.

The (b) encrypted SEED is, for example, the encrypted SEED encrypted by an individual key (Kind) described earlier with reference to (d2) in FIGS. 4 and 5.

The client performs, in step S173, after receiving such data from the server, processing to set the encrypted SEED in the SEED area of the converted encrypted content.

That is, content in which the SEED area is encrypted or replaced by a SEED is generated by executing, as illustrated by (c) in FIG. 11, processing to overwrite an encrypted SEED in an area in which dummy data such as all 0 is set.

In step S174, converted encrypted content including the encrypted SEED generated in this manner is recorded on a medium.

In a case when the processing is executed, the encrypted SEED file illustrated by (b) in FIG. 11 is not recorded on the medium, and it is possible to reduce the recording space.

(4-4) Second Content Reproduction Sequence by Client

In a case when converted encrypted content recorded in the processing described with reference to the flowchart illustrated in FIG. 11, that is, content composed of units each including an encrypted SEED and an encrypted block is recorded on a medium, reproduction processing is executed by a sequence that is different from the reproduction sequence described earlier with reference to FIG. 10.

Such a reproduction sequence will be described with reference to the flowchart illustrated in FIG. 12.

Figure 12:
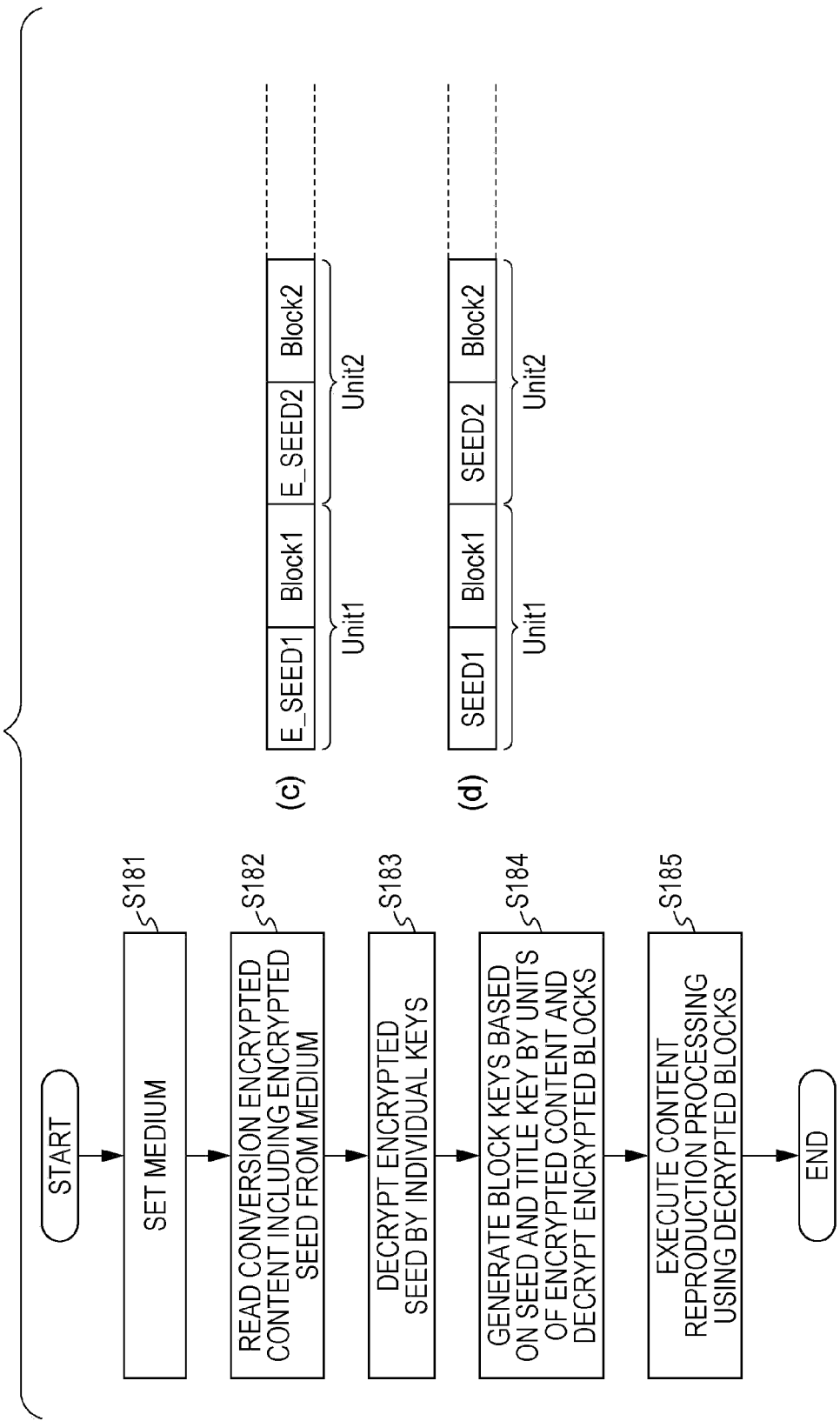
FIG. 12 is a diagram illustrating a flowchart describing a content reproduction processing sequence in a case when replacement processing of SEED data is executed and recorded on a medium by a client.

The processing illustrated in FIG. 12 is processing that is executed under the control of the data processing unit of the client.

First, in step S181, a medium on which content is recorded is set in a reproduction device (client). The content illustrated by (c) in FIG. 12, that is, content including units that are each composed of a combination of an encrypted SEED and an encrypted block is recorded on the medium.

In step S182, converted encrypted content including an encrypted SEED is read from the medium. The converted encrypted content is the content that has the data configuration illustrated by (c) in FIG. 12.

Next, in step S183, the encrypted SEED is decrypted by an individual key (Kind). Here, the individual key (Kind) is also received from the server and recorded on the medium.

The original encrypted content of before conversion illustrated by (d) in FIG. 12 is generated by the decryption of the encrypted SEED in step S182.

Next, in step S184, encrypted blocks are decrypted by generating block keys based on the SEED and the title key in units of the encrypted content.

The generation of the block keys is performed, as described earlier, by the expression below.

Kbx=(AES_E(Kt,SEEDx))(XOR)(SEEDx)

In the above expression, x represents the block identifier, AES_E(Kt, SEEDx) represents the encryption processing (AES Encryption) of the SEEDx by the title key, and (XOR) represents an exclusive OR operation.

That is, the block key of each unit is obtained as the exclusive OR operation result between the data (AES_E(Kt, SEEDx)) that is the SEED of the unit encrypted by the title key (Kt) and the SEED.

Next, in step S185, content reproduction processing using decrypted blocks is executed. Here, in the content reproduction processing, reproduction processing using both a SEED obtained by decrypting an encrypted SEED and a decrypted block is executed. Here, there is also a case when header information or substance data of the reproduced content used in reproduction processing is included in the SEED area.

In the processing of an embodiment of the disclosure, the SEED data that is one portion of the configuration data of the content provided in this manner from the server is provided to the client as data that is encrypted by individual keys. Further, the SEED area of the encrypted content is provided to the client by being set as data that is replaced by dummy data or that is deleted.

By such setting, even when acts such as leaking or disclosing the converted encrypted content received from the server along with the title key is committed, as long as the data of the original SEED portion is not obtained, decryption is not possible.

Further, in a case when encrypted SEED files or individual keys are leaked, the source of the leak of the data is able to be ascertained and specified by analyzing the configuration of the individual key data and collating with the registration information of the management information (refer to FIG. 8) of the server.

5. Content Provision Processing Sequence Applying Binding Key

Next, a processing example of executing content provision and management by using, as well as the individual keys (Kind), binding keys (Kbind) that are set as keys that are different by units of content transmission will be described with reference to FIGS. 13 and 14.

Here, the binding keys (Kbind) are keys that are used for the encryption processing of the title key applied for the decryption of encrypted content, and are generated by, for example, random number generation processing on the content server.

Figure 13:
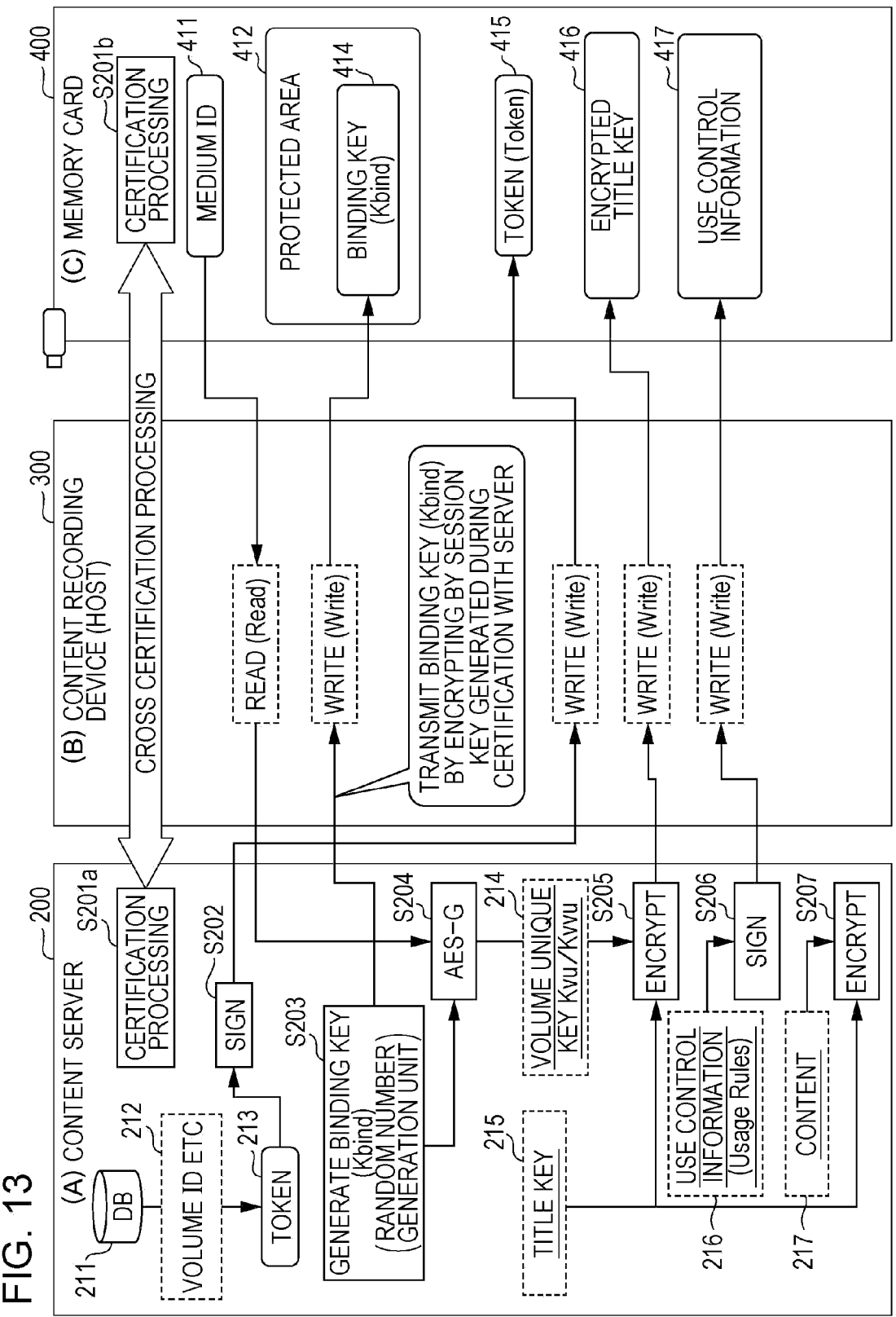
FIG. 13 is a diagram describing a processing example that executes content provision and management using, as well as individual keys (Kind), binding keys (Kbind) that are set as different keys by units of content delivery.

From the left, (A) Content server 200, (B) Content recording device (host) 300, and (C) Memory card 400 are illustrated in FIG. 13.

The (A) content server 200 corresponds to the server illustrated by (a) in FIG. 1, the (B) content recording device corresponds to the recording reproducer 22 or the PC 23 that is the content recording device (host) illustrated by (b) in FIG. 1, and the (C) memory card corresponds to the memory card 31 illustrated by (c) in FIG. 1.

A processing sequence in a case when a content server provides and records content and content management information other than the content on a memory card is illustrated in FIG. 13.

Here, in a case when content is copied from the disc 12 illustrated in FIG. 1 and recorded on a memory card, while the content is recorded from the disc to the memory card, other management information including the individual keys and the token are transmitted and recorded from the content server to the memory card.

Here, the (C) memory card 400 illustrated in FIG. 13 is equipped on the (B) content recording device (host) 300, executes communication with the (A) content server 200 via a communication unit of the (B) content recording device (host) 300, and receives and records various data received from the (A) content server 200 via the (B) content recording device (host) 300 on the memory card 400.

The processing sequence will be described with reference to FIG. 13.

First, in step S201, cross certification is executed between the content server 200 and the memory card 400. For example, cross certification processing including exchange processing of the public key certificate for each and the like are performed according to a public key encryption system. The content server 200 retains a server certificate in which public keys issued by a certificate authority are stored, and a secret key. The memory card 400 also receives in advance and stores, in the memory unit thereof, the pair of public key certificate and secret key from the certificate authority.

Here, the memory card stores programs that perform cross certification processing and permissibility determination of access to a protected area, and includes a data processing unit that executes such programs. The protected area will be described later.

If the cross certification between the content server 200 and the memory card 400 is satisfied and the legitimacy of both is verified, the server 200 provides a variety of data to the memory card 400. In a case when the cross certification is not satisfied, the data provision processing from the server 200 is not performed.

Once the cross certification is satisfied, the content server 200 obtains data such as the volume ID that is an identifier corresponding to a specified content collection recorded in a database 211, the content ID as a content identifier, or the like, generates a token 213 on which such IDs and other content management information is recorded, and, in step S202, executes a signature on the token 213 and transmits to the content recording device (host) 300, that is, transmits as writing data to the memory card 400.

Here, the token 213 is data on which content ID as an identifier of the provided content, a hash value for verifying the legitimacy of use control information provided to a client as data in which use regulations for the content are defined, or the like is recorded. The token has the signature of the server set therein, and is set for verification of falsification to be possible.

The client verifies the legitimacy of the token by verifying the signature of the token when the content is reproduced, verifies the legitimacy of a use control information file that is received from a server based on the hash value of the use control information recorded on the token, and performs use (reproduction or copying) of the content according to the use control information recorded on the use control information file, the legitimacy of which has been verified.

The token is transmitted to the (C) memory card 400 from the (A) content server 200 via the (B) content recording device (host) 300, and is recorded on the memory card 400. The recorded data is the token 415 illustrated in the (C) memory card 400 in FIG. 13.

Here, the memory card 400 is demarcated into a protected area in which there is access restriction according to the device, and an unprotected area (user area) with no access restriction.

Figure 15:
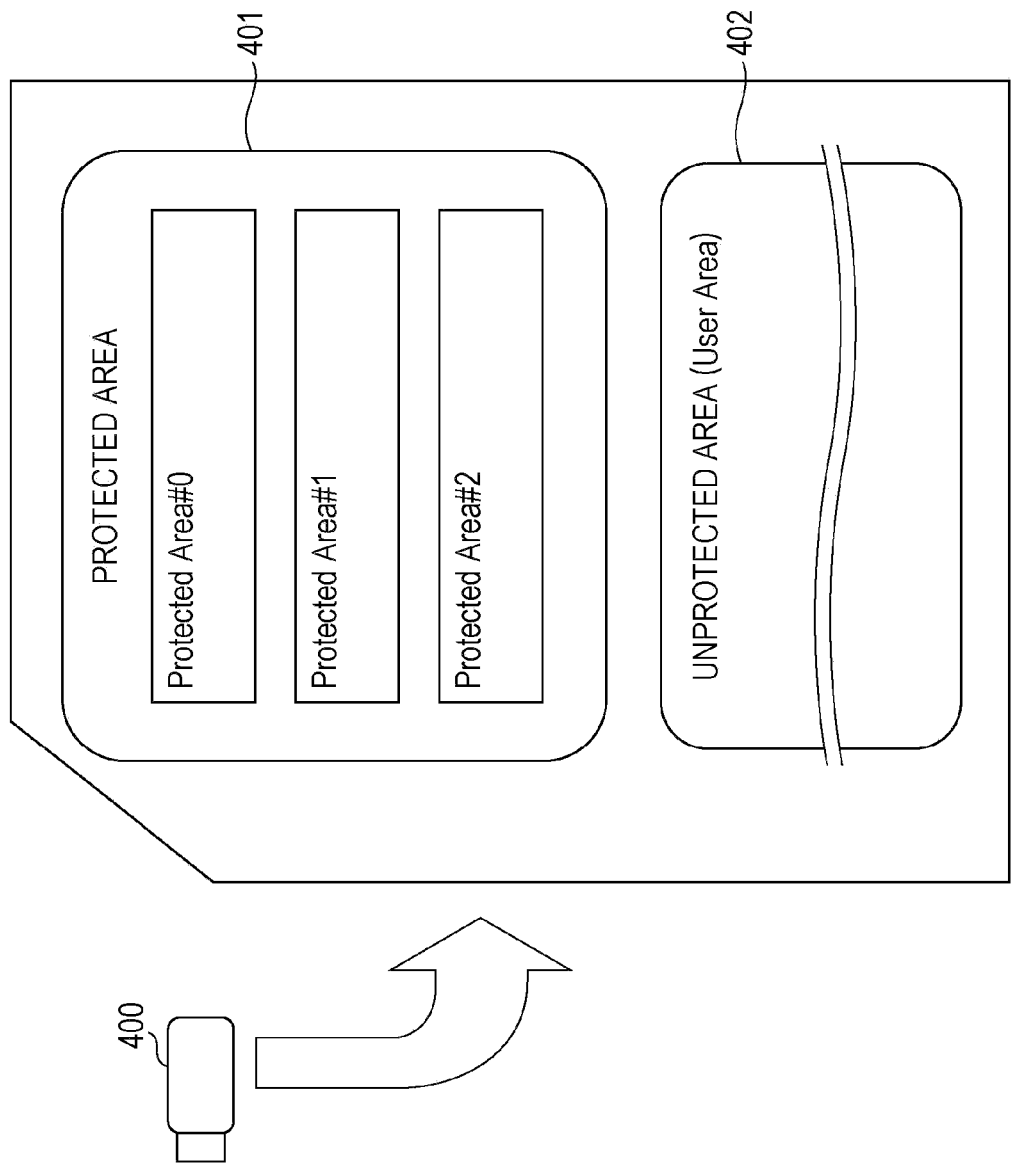
FIG. 15 is a diagram describing a specific configuration example of the memory area of a memory card.

A specific configuration example of the memory area of the memory card 400 is illustrated in FIG. 15.

The memory area of the memory card 400 is configured, as illustrated in FIG. 15, by the below two areas.

(a) Protected area 401
(b) Unprotected area (user area) 402

The (b) unprotected area (user area) 402 is an area that is freely accessible by a recording reproduction device used by the user, and has content and general content management data or the like recorded thereon. The (b) unprotected area (user area) 402 is an area to and from which the user is able to freely write and read data.

On the other hand, the (a) protected area 401 is an area to which free access is not permitted.

For example, in a case when performing reading or writing of data by a recording reproduction device, a reproduction device, a server connected via a network, or the like used by the user, the permissibility of reading or writing for each device is determined by a program stored on the memory card 400 in advance.

The memory card 400 includes a data processing unit for executing a program stored in advance and a certification processing unit that executes certification processing, and the memory card 400 first performs certification processing of a device attempting to execute writing or reading of data to or from the memory card 400.

At the stage of the certification processing, a device certificate (for example, a server certificate) such as a public key certificate is received from the partner device, that is, the access requesting device, and using the information recorded on the certificate, it is determined whether or not access to each of the demarcated areas of the protected area 401 is permitted. The determination processing is performed by units of the demarcated areas (the areas #0, #1, #2 . . . in the drawing) within the protected area 401 illustrated in FIG. 15, and only approved processing in approved areas is permitted.

Such restriction information of reading/writing (PAD read/Pad write) from and to a medium is set by, for example, units of the accessing device, for example, a content server, or a recording reproduction device (host). Such information is recorded on a server certificate or a host certificate corresponding to each device.

The memory card 400 verifies the recorded data on the server certificate or the host certificate according to a regulated program stored in advance on the memory card 400, and performs processing to only permit access to areas to which there is access approval.

A protected area 412 is indicated in the (C) memory card 400 illustrated in FIG. 13. Areas other than the protected area 412 are unprotected areas. As illustrated in the drawing, a binding key (Kbind) 414 is recorded in the protected area 412. Other pieces of data are recorded in the unprotected area (user area).

Here, the binding keys (Kind) 414 are keys that are used in the encryption processing of a title key that is applied to the decryption of encrypted content, and is generated by random number generation processing or the like on the content server.

As illustrated as the processing of step S203 of the (A) content server 200 of FIG. 13, the binding keys (Kbind) are generated on the content server. The keys are generated and provided to a memory card by a server successively executing random number generation or the like every time that processing to provide content to a memory card or processing to copy content from a disc is executed. Therefore, different binding keys (Kbind) are generated for each processing of providing or copying content.

The generated binding keys (Kbind) of the server 200 are written into the protected area of the memory card 400.

Here, the processing of writing into the protected area or reading from the protected area of the memory card 400 is restricted. The permissibility of writing or reading is set by units of the access requesting device (server or recording reproduction device (host)) and in units of the demarcated areas (#1, #2 . . . ) set in the protected area.

The memory card records the binding keys (Kbind) in the demarcated area within the protected area into which writing is permitted by referencing a certificate received from the access requesting device, for example, a server certificate. That is, the binding keys (Kind) 414 illustrated in FIG. 13. Here, although the inside of the protected area 412 is not illustrated in detail in FIG. 13, the protected area is demarcated into a plurality of demarcated areas (#0, #1, #2 . . . ), and the binding keys (Kbind) 414 are recorded in the demarcated areas that are recorded as writing permitted areas on the server certificate.

Here, the transmission of binding keys from the content server 200 to the memory card 400 is performed as the transmission of data that is encrypted by a session key.

The session key is generated when cross certification processing (step S201) is performed between the server 200 and the memory card 400, and is a key that is shared by both. The memory card 400 decrypts the encrypted binding keys by the session key and records in a predetermined demarcated area in the protected area 412 of the memory card 400.

The (A) content server 200 illustrated in FIG. 13 next performs, in step S204, key generation processing (AES-G) using the generated binding key (Kbind) and a medium ID received from the (C) memory card 400. The key generated here is referred to as a volume unique key.

Here, the medium ID is an ID that is recorded in the memory of the memory card 400 in advance as identification information of the memory card 400.

Next, the content server 200 generates, in step S205, an encrypted title key by encrypting the title key (for example, a CPS unit key) 215 that is the encrypted key of the content by a volume unique key.

The (A) content server 200 transmits the generated encrypted title key to the (C) memory card 400 via the (B) content recording device (host) 300. The memory card 400 records the received encrypted title key on the memory card 400. The recorded data is the encrypted title key 416 illustrated in the (C) memory card 400 in FIG. 13. Here, the title key is also referred to as the CPS unit key.

In addition, the content server 200 generates the use control information 216 that corresponds to the content, and in step S206, executes signature processing by a secret key of the content server 200 and provides the use control information 216 to the memory card 400.

Further, in step S207, the content server 200 encrypts the content 217 by a title key 215.

The encrypted content generated here is, for example, the original content illustrated by (c1) in FIGS. 3 and 4. The original content is encrypted by the different block keys (Kb1 to kbn) that are generated by the block of each unit respectively using the SEED of each unit. In the past, such encrypted content had been provided as it is.

In the configuration of an embodiment of the disclosure, the server 200 performs processing to convert the original encrypted content.

The processing will be described with reference to FIG. 14.

The content server 200 performs, in step S208, using the original encrypted content generated in step S207, replacement or deletion of SEED data.

The processing corresponds to the processing of step S11 described with reference to FIG. 4 earlier. Specifically, data of the SEED areas (SEED1 to SEEDn) of the encrypted content is replaced by dummy data, for example, dummy data set to all 0 or all 1. Alternatively, the SEED data is deleted.

Figure 14:
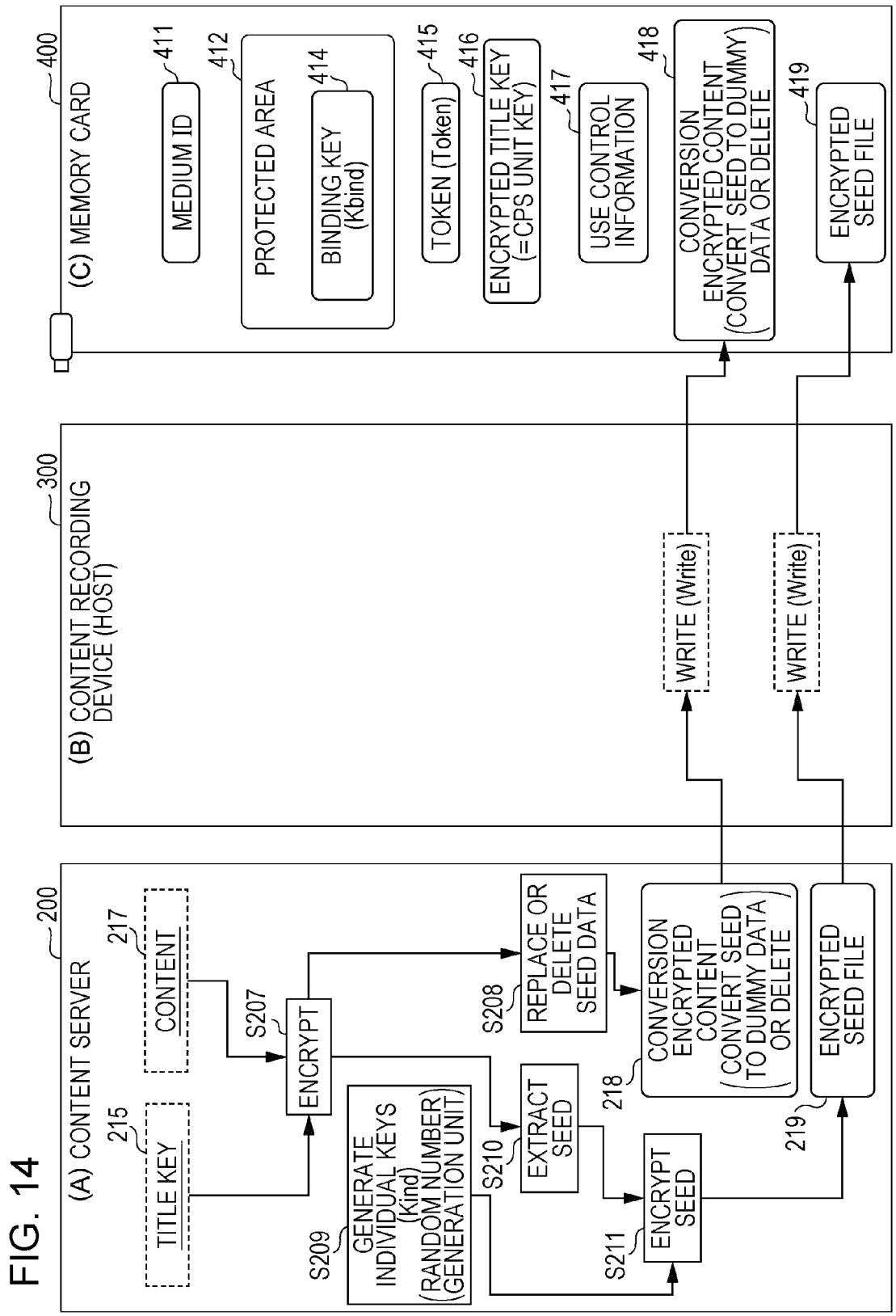
FIG. 14 is a diagram describing a processing example that executes content provision and management using, as well as individual keys (Kind), binding keys (Kbind) that are set as different keys by units of content delivery.

The processing result is the converted encrypted content 218 of FIG. 14, which corresponds to the (d1) converted encrypted content of FIG. 4. The converted encrypted content 218 is, as illustrated by (d1) in FIG. 4, data in which the SEED areas (SEED1 to SEEDn) are all set to 0. The block areas (block1 to blockn) are data that is the same as the (c1) encrypted content, and in which each block is encrypted by a block key (Kbx) generated by a unit-compatible SEED and a title key.

The converted encrypted content 218 of FIG. 14 is provided from the server 200 via the content recording device (host) 300 and recorded on the memory card 400.

The converted encrypted data 218 is the converted encrypted content 418 illustrated as the recorded data of the memory card 400 in FIG. 14.

The content server 200 next generates, in step S209, individual keys (Kind). The individual keys (Kind) are generated, for example, by random number generation processing. Such individual keys (Kind) are generated as keys that are different by units of content transmission processing or by units of users.

Further, in step S210, only the SEED data is extracted from the original encrypted content (encrypted content illustrated by (c1) in FIGS. 3 and 4) generated in step S207, and in step S211, encryption processing is executed using the individual keys (Kind).

By the encryption processing, an encrypted SEED file 219 is created. The SEED file 219 is the data described with reference to (d2) in FIGS. 4 and 5 or the like, and is encrypted data of the original SEED data of original content. Here, the original SEED is data that is used for the generation of block keys.

The encrypted SEED file 219 of FIG. 14 is provided and recorded from the server 200 to the memory card 400 via the content recording device (host) 300.

The encrypted SEED file 219 is the encrypted SEED file 419 shown as the recorded data of the memory card 400 in FIG. 14.

Here, in the processing example, a binding key is recorded in the protected area of the memory card. A title key is obtained for the decryption processing of the encrypted content, and the title key is encrypted, as described above, by a volume unique key that is generated using the binding key and the medium ID.

Therefore, in order to obtain a title key from a reproduction device, processing to obtain the title key by taking out a binding key recorded in the protected area of a memory card, generating a volume unique key using the medium ID, and decrypting the encrypted title key applying the generated volume unique key is performed. Thereafter, the sequence involves executing decryption of each block by generating block keys using the title key and the SEED.

Here, processing to return the converted encrypted content to the original encrypted content of before conversion is executed by the same processing as the processing described earlier with reference to the flowcharts illustrated in FIGS. 10 and 12.

6. Hardware Configuration Example of Each Device

Finally, a hardware configuration example of each device that executes the processing described above will be described with reference to FIGS. 16 and 17.

Figure 16:
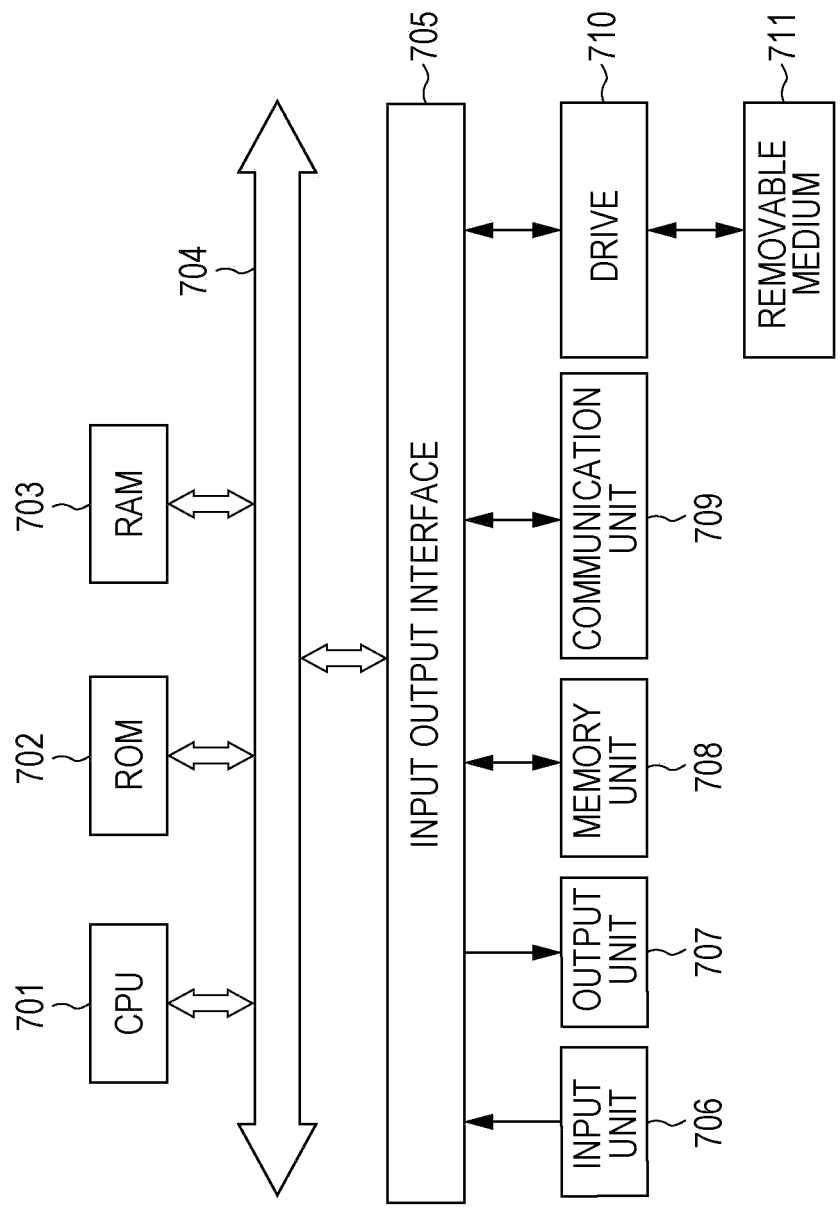
FIG. 16 is a diagram describing a hardware configuration example of an information processing device as a server and a client.

First, hardware configuration examples of a server that executes content provision processing and an information processing device as a client that equips a memory card and performs recording or reproduction processing of data will be described with reference to FIG. 16.

A CPU (Central Processing Unit) 701 functions as a data processing unit that executes various processes according to a program stored in a ROM (Read Only Memory) 702 or a memory unit 708. For example, the CPU 701 executes communication processing between a server and a client, processing to record received data into a memory card (the removable medium 711 in the drawing), processing to reproduce data from the memory card (the removable medium 711 in the drawing), and the like described in the examples described above. Programs that the CPU 701 executes or data is appropriately recorded in a RAM (Random Access Memory) 703. The CPU 701, the ROM 702, and the RAM 703 are mutually connected by a bus 704.

The CPU 701 is connected to an input output interface 705 via the bus 704, and an input unit 706 composed of carious switches, a keyboard, a mouse, a microphone, and the like, and an output unit 707 composed of a display, speakers, and the like are connected to the input output interface 705. The CPU 701 executes various processes corresponding to commands input by the input unit 706, and outputs the processing results to, for example, the output unit 707.

The memory unit 708 connected to the input output interface 705 is composed of, for example, a hard disk, and stores programs that the CPU 701 executes and various data. A communication unit 709 communicates with external devices via a network such as the Internet or a local area network.

A drive 710 that is connected to the input output interface 705 drives the removable medium 711 that is a magnetic disk, an optical disc, a semiconductor memory, or the like, and obtains various data such as the content, key information, and programs that are recorded. For example, data processing according to an obtained program, data processing by the CPU using content or key data, key generation, encryption of content, recording processing, decryption, reproduction processing, or the like is performed.

Figure 17:
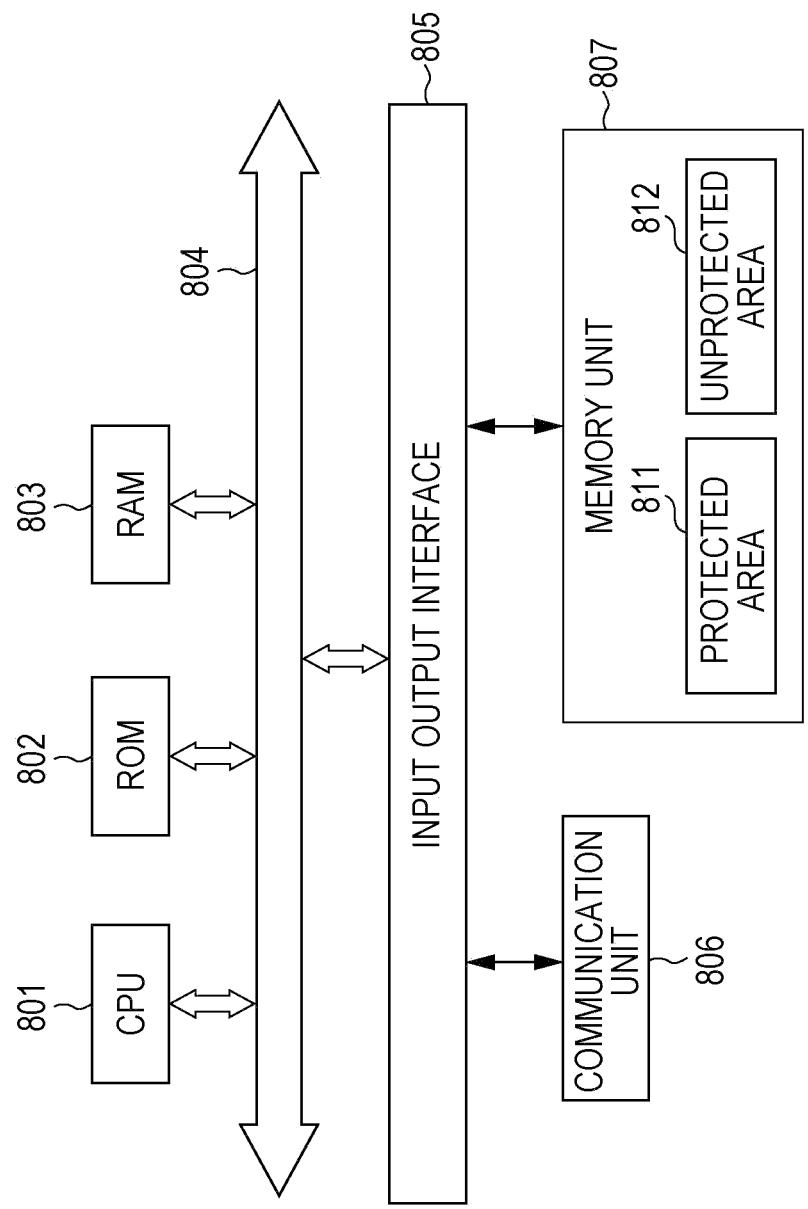
FIG. 17 is a diagram describing a hardware configuration example of a memory card.

FIG. 17 illustrates a hardware configuration example of a memory card.

A CPU 801 functions as a data processing unit that executes various processes according to a program stored in a ROM (Read Only Memory) 802 or a memory unit 807. For example, the CPU 801 executes communication processing with a server or a host apparatus, processing such as writing and reading of data to and from the memory unit 807, permissibility determination processing for access to a protected area 811 of the memory unit 807 by units of demarcated areas, and the like described in the examples described above. Programs that the CPU 801 executes or data is appropriately stored in a RAM (Random Access Memory) 803. The CPU 801, the ROM 802, and the RAM 803 are mutually connected by a bus 804.

The CPU 801 is connected to an input output interface 805 via the bus 804, and a communication unit 806 and the memory unit 807 are connected to the input output interface 805.

The communication unit 806 connected to the input output interface 805 executes, for example, communication with a server or host apparatuses. The memory unit 807 is a memory area of data, and as described earlier, includes the protected area 811 to which there is access restriction, and an unprotected area 812 from which data recording is able to be read freely.

Above, the embodiments of the disclosure have been discussed in detail with reference to specific examples. However, it is self-evident that amendments and substitutions are able to be made to the examples by those skilled in the art without departing from the gist of the disclosure. That is, the embodiments of the disclosure have been disclosed in the form of examples, and are not to be interpreted as limiting. The scope of the claims of the patent is to be consulted in order to assess the gist of the disclosure.

In addition, the series of processing described in the specifications is able to be executed by hardware, software, or a combination of both. In a case when processing is performed by software, a program on which the processing sequence is recorded is able to be installed in the memory of a computer included in dedicated hardware and executed, or the program is able to be executed by installing in a general-purpose computer that is able to execute various processes. For example, the program is able to be recorded on a recording medium in advance. Other than installing on a computer from a recording medium, the program is able to be received via a network such as a LAN (Local Area Network) or the Internet and installed on a recording medium such as a built-in hard disk.

Here, the various processes described in the specifications may be executed, without being executed in chronological order according to the description, in parallel or individually according to need or the processing capacity of the devices executing the processing. Further, a system according to the present specification is a logically collected configuration of a plurality of devices, and the devices of the respective configurations are not limited to be within the same housing.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device comprising:
a data processing unit that generates content for transmitting to a client; and
a communication unit that transmits the generated content of the data processing unit,
wherein the data processing unit generates, based on basic encrypted content having a plurality of units that each includes a SEED that is data for encryption key generation and a block that is encrypted data that is encrypted by an encryption key generated using the SEED, each data of
(a) converted encrypted content on which conversion processing to replace the SEED with dummy data or to delete the SEED is performed, and
(b) encrypted SEED that is the SEED encrypted by content transmission processing or by individual keys that are different by units of users at a transmission destination, and
transmits the generated converted encrypted content and encrypted SEED as data provided to a client via the communication unit,
wherein the data processing unit encrypts a title key to obtain an encrypted title key and transmits the encrypted title key to the client via the communication unit.

2. The information processing device according to claim 1, wherein the data processing unit generates the individual keys by random number generation processing.

3. The information processing device according to claim 1, wherein the data processing unit performs processing to generate management information that is the individual keys made to correspond with content transmission destination information and to store the management information in a memory unit.

4. The information processing device according to claim 1, wherein the data processing unit further encrypts and transmits the generated individual keys as data provided to a client via the communication unit.

5. The information processing device according to claim 1, wherein the data processing unit executes certification processing with the client, further generates a session key that is a shared secret key, and performs encryption of data transmitted to a client by applying a generated session key.

6. An information processing device comprising:
a data processing unit that generates content for transmitting to a client; and
a communication unit that transmits the generated content of the data processing unit,
wherein the data processing unit generates, based on basic encrypted content having a plurality of units that each includes a SEED that is data for encryption key generation and a block that is encrypted data that is encrypted by an encryption key generated using the SEED, each data of
(a) converted encrypted content on which conversion processing to replace the SEED with dummy data or to delete the SEED is performed, and
(b) encrypted SEED that is the SEED encrypted by content transmission processing or by individual keys that are different by units of users at a transmission destination, and transmits the generated converted encrypted content and encrypted SEED as data provided to a client via the communication unit, wherein the data processing unit generates an encrypted title key by encrypting a title key by an encryption key generated by applying medium IDs that are identifiers of a recording medium received from the client and binding keys that are successively generated, and transmits the generated encrypted title key and the binding keys to the client via the communication unit.

7. An information processing device comprising:
a memory unit that stores encrypted content; and
a data processing unit that executes reproduction processing of the encrypted content stored in the memory unit,
wherein in the memory unit is stored each data of
(a) converted encrypted content on which conversion processing to replace the SEED with dummy data or to delete the SEED is performed, and
(b) encrypted SEED that is the SEED encrypted by content transmission processing or by individual keys that are different by units of users at a transmission destination,
that are generated based on basic encrypted content having a plurality of units that each includes a SEED that is data for encryption key generation and a block that is encrypted data that is encrypted by an encryption key generated using the SEED, and
the data processing unit decrypts the encrypted SEED by individual keys, generates the basic encrypted content by setting the decrypted SEED in a SEED area of the converted encrypted content, and executes decryption processing of content by executing block key generation processing by units on generated basic encrypted content,
wherein in the memory unit is stored a binding key or keys and an encrypted title key formed by encrypting a title key by an encryption key generated by applying a medium ID that is an identifier of the memory unit and the binding key(s) that are successively generated, and
wherein the data processing unit decrypts the encrypted title key by utilizing the stored binding key and the memory unit ID to obtain the title key, and utilizes the obtained title key in executing the block key generation processing.

8. An information processing device comprising:
a communication unit that receives data transmitted from a server; and
a data processing unit that executes data processing on the data received via the communication unit and that executes data storage processing to a memory unit,
wherein the communication unit receives, from the server, each data of
(a) converted encrypted content on which conversion processing to replace the SEED with dummy data or to delete the SEED is performed, and
(b) encrypted SEED that is the SEED encrypted by content transmission processing or by individual keys that are different by units of users at a transmission destination,
that are generated based on basic encrypted content having a plurality of units that each includes a SEED that is data for encryption key generation and a block that is encrypted data that is encrypted by an encryption key generated using the SEED, and
the data processing unit executes reconversion of the converted encrypted content of setting the encrypted SEED in a SEED area of the converted encrypted content, and executes processing to record the reconverted encrypted content in the memory unit, wherein the communication unit receives from the server a binding key(s) and an encrypted title key obtained by encrypting a title key by an encryption key generated by applying medium ID that is an identifier of the memory unit and the binding key(s) that are successively generated, and the data processing unit executes processing to record the encrypted title key and the binding key(s) to the memory unit.

9. An information processing method that is executed by an information processing device as a server, comprising:
data processing by a data processing unit of generating content for transmitting to a client; and
transmitting the content generated in the data processing by a communication unit,
wherein the data processing includes generating of each data of
(a) converted encrypted content on which conversion processing to replace the SEED with dummy data or to delete the SEED is performed, and
(b) encrypted SEED that is the SEED encrypted by content transmission processing or by individual keys that are different by units of users at a transmission destination,
that are based on basic encrypted content having a plurality of units that each includes a SEED that is data for encryption key generation and a block that is encrypted data that is encrypted by the encryption key generated using the SEED, and
the transmitting includes transmitting the generated converted encrypted content and the encrypted SEED,
wherein the data processing includes generating an encrypted title key by encrypting a title key by an encryption key generated by applying medium IDs that are identifiers of a recording medium received from the client and binding keys that are successively generated, and wherein the communication unit transmits the generated encrypted title key and the binding keys to the client.

10. An information processing method that is executed by an information processing device, the information processing device comprising:
a memory unit in which encrypted content is stored; and
a data processing unit that executes reproduction processing of the encrypted content stored in the memory unit,
wherein in the memory unit is stored each data of
(a) converted encrypted content on which conversion processing to replace the SEED with dummy data or to delete the SEED is performed, and
(b) encrypted SEED that is the SEED encrypted by content transmission processing or by individual keys that are different by units of users at a transmission destination,
that are generated based on basic encrypted content having a plurality of units that each includes a SEED that is data for encryption key generation and a block that is encrypted data that is encrypted by an encryption key generated using the SEED, and
the data processing unit decrypts an encrypted SEED by an individual key, generates the basic encrypted content by setting a decrypted SEED in a SEED area of the converted encrypted content, and executes decryption processing of content by executing block key generation processing by units on generated the basic encrypted content,
wherein in the memory unit is stored a binding key or keys and an encrypted title key formed by encrypting a title key by an encryption key generated by applying a medium ID that is an identifier of the memory unit and the binding key(s) that are successively generated, and wherein the data processing unit decrypts the encrypted title key by utilizing the stored binding key and the memory unit ID to obtain the title key, and utilizes the obtained title key in executing the block key generation processing.

11. An information processing method that is executed by an information processing device, the information processing device comprising:
a communication unit that receives data transmitted from a server; and
a data processing unit that executes data processing on the data received via the communication unit and that executes data storage processing to a memory unit,
wherein the communication unit receives, from the server, each data of
(a) converted encrypted content on which conversion processing to replace the SEED with dummy data or to delete the SEED is performed, and
(b) encrypted SEED that is the SEED encrypted by content transmission processing or by individual keys that are different by units of users at a transmission destination,
that are generated based on basic encrypted content having a plurality of units that each includes a SEED that is data for encryption key generation and a block that is encrypted data that is encrypted by the encryption key generated using the SEED, and
the data processing unit executes reconversion of the converted encrypted content of setting the encrypted SEED in a SEED area of the converted encrypted content, and executes processing to record the reconverted encrypted content in the memory unit,
wherein the communication unit receives from the server a binding key(s) and an encrypted title key obtained by encrypting a title key by an encryption key generated by applying medium ID that is an identifier of the memory unit and the binding key(s) that are successively generated, and the data processing unit executes processing to record the encrypted title key and the binding key(s) to the memory unit.

12. A non-transitory computer readable storage medium having stored thereon a program that executes information processing in an information processing device as a server, comprising:
data processing of causing a data processing unit to generate content for transmission to a client; and
causing a communication unit to transmit content generated in the data processing,
wherein in the data processing,
(a) converted encrypted content on which conversion processing to replace the SEED with dummy data or to delete the SEED is performed, and
(b) encrypted SEED that is the SEED encrypted by content transmission processing or by individual keys that are different by units of users at a transmission destination, are caused to be generated based on basic encrypted content having a plurality of units that each includes a SEED that is data for encryption key generation and a block that is encrypted data that is encrypted by the encryption key generated using the SEED, and
in the causing, the generated converted encrypted content and the encrypted SEED are caused to be transmitted,
wherein the data processing includes generating an encrypted title key by encrypting a title key by an encryption key generated by applying medium IDs that are identifiers of a recording medium received from the client and binding keys that are successively generated,
and wherein the communication unit transmits the generated encrypted title key and the binding keys to the client.

13. A non-transitory computer readable storage medium having stored thereon a program that executes information processing in an information processing device, the information processing device comprising:
a memory unit in which encrypted content is stored; and
a data processing unit that executes reproduction processing of the encrypted content stored in the memory unit,
wherein in the memory unit is stored each data of
(a) converted encrypted content on which conversion processing to replace the SEED with dummy data or to delete the SEED is performed, and
(b) encrypted SEED that is the SEED encrypted by content transmission processing or by individual keys that are different by units of users at a transmission destination,
that are generated based on basic encrypted content having a plurality of units that each includes a SEED that is data for encryption key generation and a block that is encrypted data that is encrypted by an encryption key generated using the SEED, and
the program causes the data processing unit to decrypt the encrypted SEED by an individual key, generates the basic encrypted content by setting decrypted SEED in a SEED area of the converted encrypted content, and executes decryption processing of content by executing block key generation processing by units on the generated basic encrypted content,
wherein in the memory unit is stored a binding key or keys and an encrypted title key formed by encrypting a title key by an encryption key generated by applying a medium ID that is an identifier of the memory unit and the binding key(s) that are successively generated, and
wherein the program causes the data processing unit to decrypt the encrypted title key by utilizing the stored binding key and the memory unit ID to obtain the title key, and to utilize the obtained title key in executing the block key generation processing.

14. A non-transitory computer readable storage medium having stored thereon a program that executes information processing in an information processing device, the information processing device comprising:
a communication unit that receives data transmitted from a server; and
a data processing unit that executes data processing on the data received via the communication unit and that executes data storage processing to a memory unit,
wherein the program causes the communication unit to receive, from the server, each data of
(a) converted encrypted content on which conversion processing to replace the SEED with dummy data or to delete the SEED is performed, and
(b) encrypted SEED that is the SEED encrypted by content transmission processing or by individual keys that are different by units of users at a transmission destination,
that are generated based on basic encrypted content having a plurality of units that each includes a SEED that is data for encryption key generation and a block that is encrypted data that is encrypted by an encryption key generated using the SEED, and
causes the data processing unit to execute reconversion of the converted encrypted content of setting the encrypted SEED in a SEED area of the converted encrypted content, and execute processing to record the reconverted encrypted content in the memory unit, wherein program causes the communication unit to receive from the server a binding key(s) and an encrypted title key obtained by encrypting a title key by an encryption key generated by applying medium ID that is an identifier of the memory unit and the binding key(s) that are successively generated, and causes the data processing unit to execute processing to record the encrypted title key and the binding key(s) to the memory unit.

* * * * *